United States Patent
Yamauchi et al.

(10) Patent No.: US 7,980,586 B2
(45) Date of Patent: Jul. 19, 2011

(54) FRONT PASSENGER SEAT AIRBAG APPARATUS

(75) Inventors: Koji Yamauchi, Aichi-ken (JP); Kenichi Fukurono, Aichi-ken (JP); Yasushi Okada, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/588,567

(22) Filed: Oct. 20, 2009

(65) Prior Publication Data

US 2010/0117337 A1     May 13, 2010

(30) Foreign Application Priority Data

Nov. 12, 2008 (JP) ................... 2008-289762
Aug. 26, 2009 (JP) ................... 2009-195774

(51) Int. Cl.
*B60R 21/16* (2006.01)
(52) U.S. Cl. ................................... 280/728.2
(58) Field of Classification Search ............... 280/728.2, 280/728.3, 732
See application file for complete search history.

(56) References Cited

U.S. PATENT DOCUMENTS

| | | | | |
|---|---|---|---|---|
| 5,482,313 A * | 1/1996 | Ikeya et al. | ............ | 280/728.2 |
| 5,588,669 A * | 12/1996 | Leonard et al. | ............ | 280/728.3 |
| 6,161,865 A * | 12/2000 | Rose et al. | ............ | 280/728.3 |
| 6,193,269 B1 * | 2/2001 | Amamori | ............ | 280/728.2 |
| 6,296,270 B1 * | 10/2001 | Amamori | ............ | 280/728.2 |
| 6,902,186 B2 * | 6/2005 | Suzuki et al. | ............ | 280/730.1 |
| 7,048,297 B2 * | 5/2006 | Schneider | ............ | 280/728.2 |
| 7,255,365 B2 * | 8/2007 | Geyer et al. | ............ | 280/732 |
| 7,275,759 B2 * | 10/2007 | Sawada | ............ | 280/728.3 |
| 7,695,001 B2 * | 4/2010 | Adler et al. | ............ | 280/728.3 |
| 7,731,234 B2 * | 6/2010 | Adler et al. | ............ | 280/740 |
| 2003/0067143 A1 * | 4/2003 | Nelson et al. | ............ | 280/728.2 |
| 2008/0012273 A1 * | 1/2008 | Cowelchuk et al. | ............ | 280/728.3 |

FOREIGN PATENT DOCUMENTS

| | | |
|---|---|---|
| JP | A-2006-088830 | 4/2006 |
| JP | A-2008-110737 | 5/2008 |

* cited by examiner

*Primary Examiner* — Paul N Dickson
*Assistant Examiner* — Robert A Coker
(74) *Attorney, Agent, or Firm* — Posz Law Group, PLC

(57) ABSTRACT

A front passenger seat airbag apparatus 12 includes an airbag 15, a case 25 supporting the airbag 15, and an airbag cover 50 covering the airbag 15. The case 25 includes a tubular inner wall portion 29. A plurality of claw portions 37 are arranged along a vehicle widthwise direction on the upper edge of a front inner wall 31 and a rear inner wall 32 of the tubular inner wall portion 29. The airbag cover 50 includes a tubular outer wall portion 53 having a plurality of engaging holes 57. The tubular outer wall portion 53 is engaged with the case 25 by inserting and engaging the claw portions 37 in the engaging holes 57. The front inner wall 31 and the rear inner wall 32 each include connected portions 66, to each of which a claw portion 37 is connected, and non-connected portions 65, to which no claw portion 37 is connected, along the arrangement direction of the claw portions 37. Two non-connected portions 65 are located on both sides of each connected portion 66. At least one of the non-connected portions 65 has cutout portions 61, 62 that extend from the upper end of the corresponding inner wall to a position lower than the tips 37A of the claw portions 37.

12 Claims, 15 Drawing Sheets

Widthwise Direction

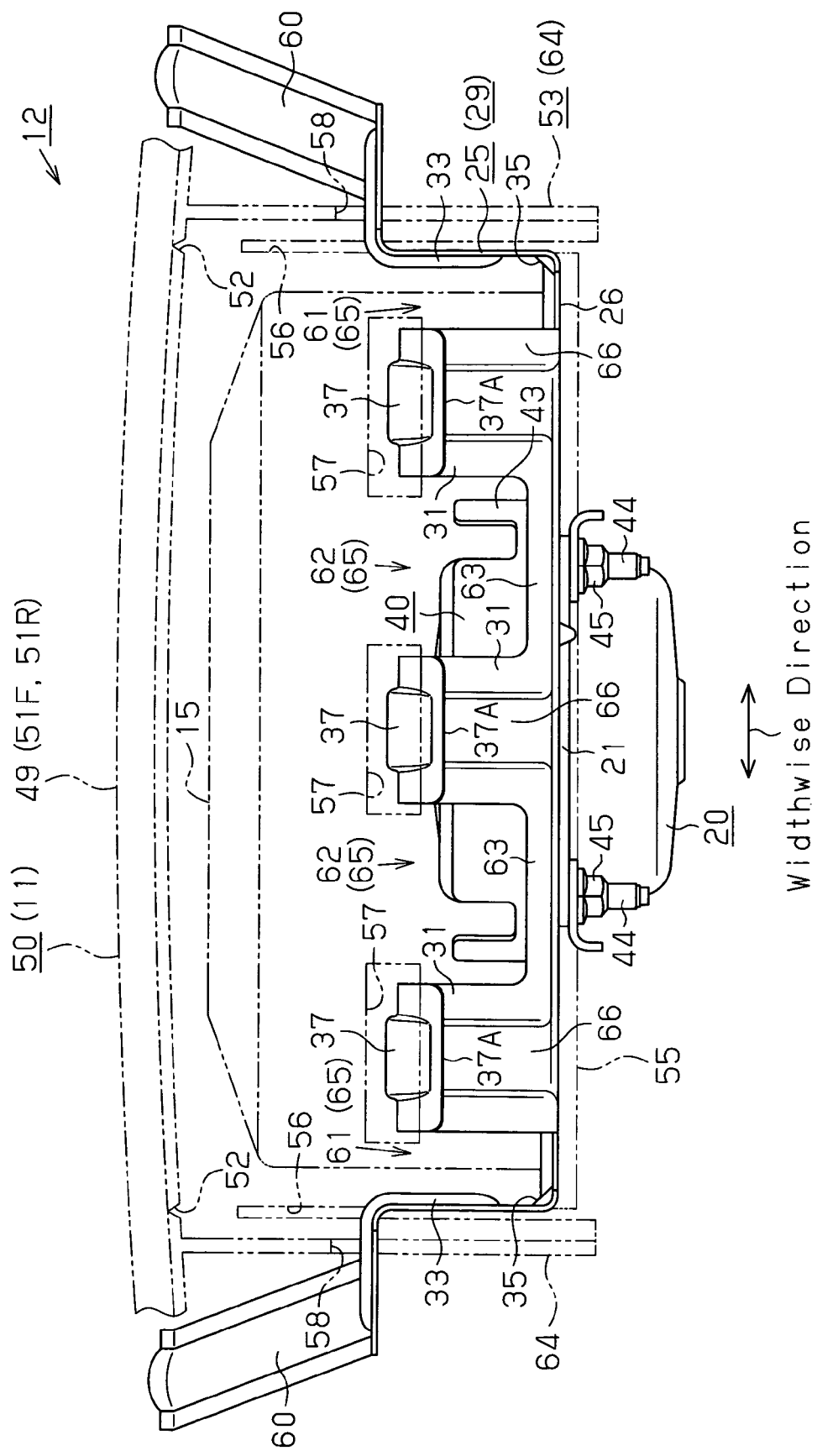

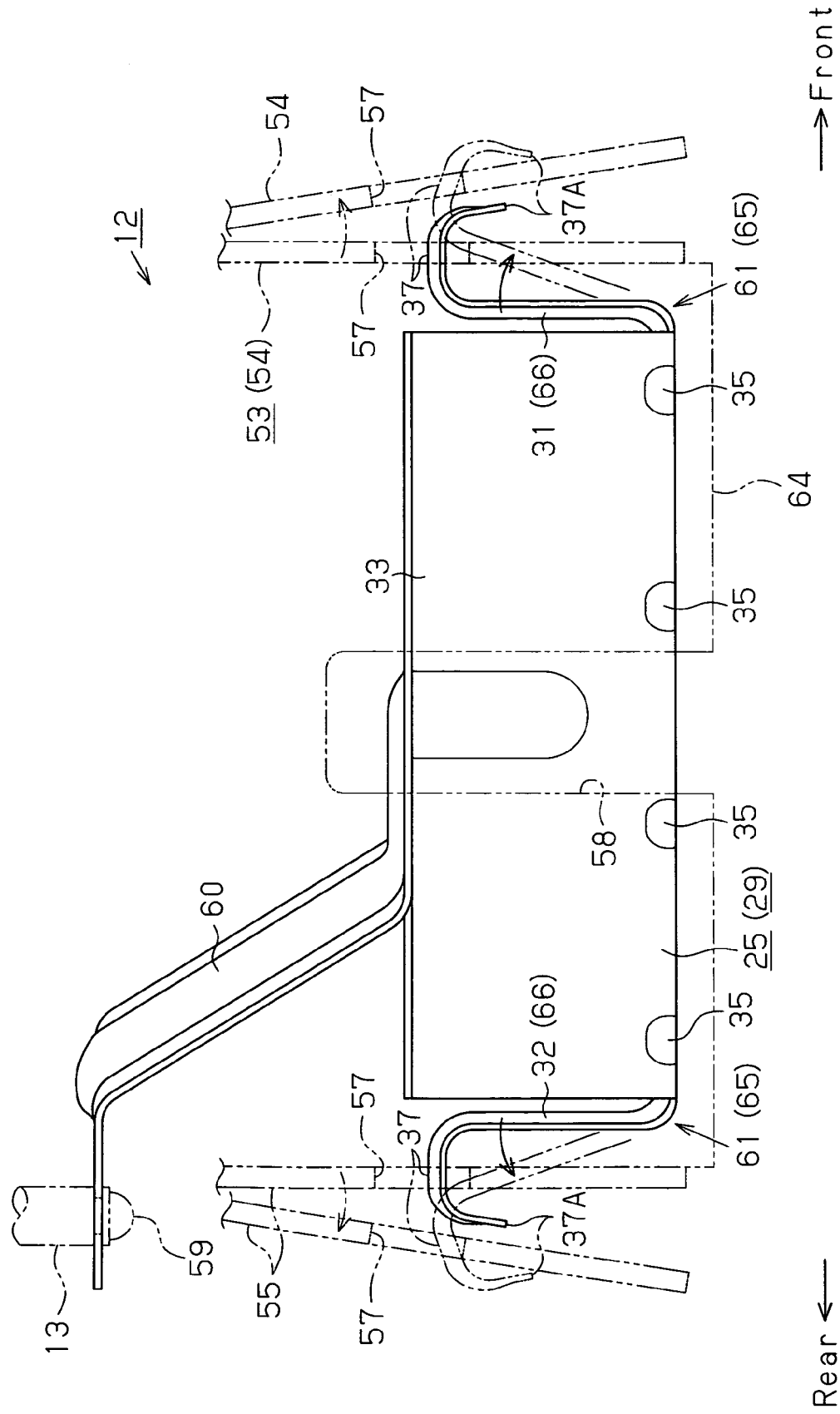

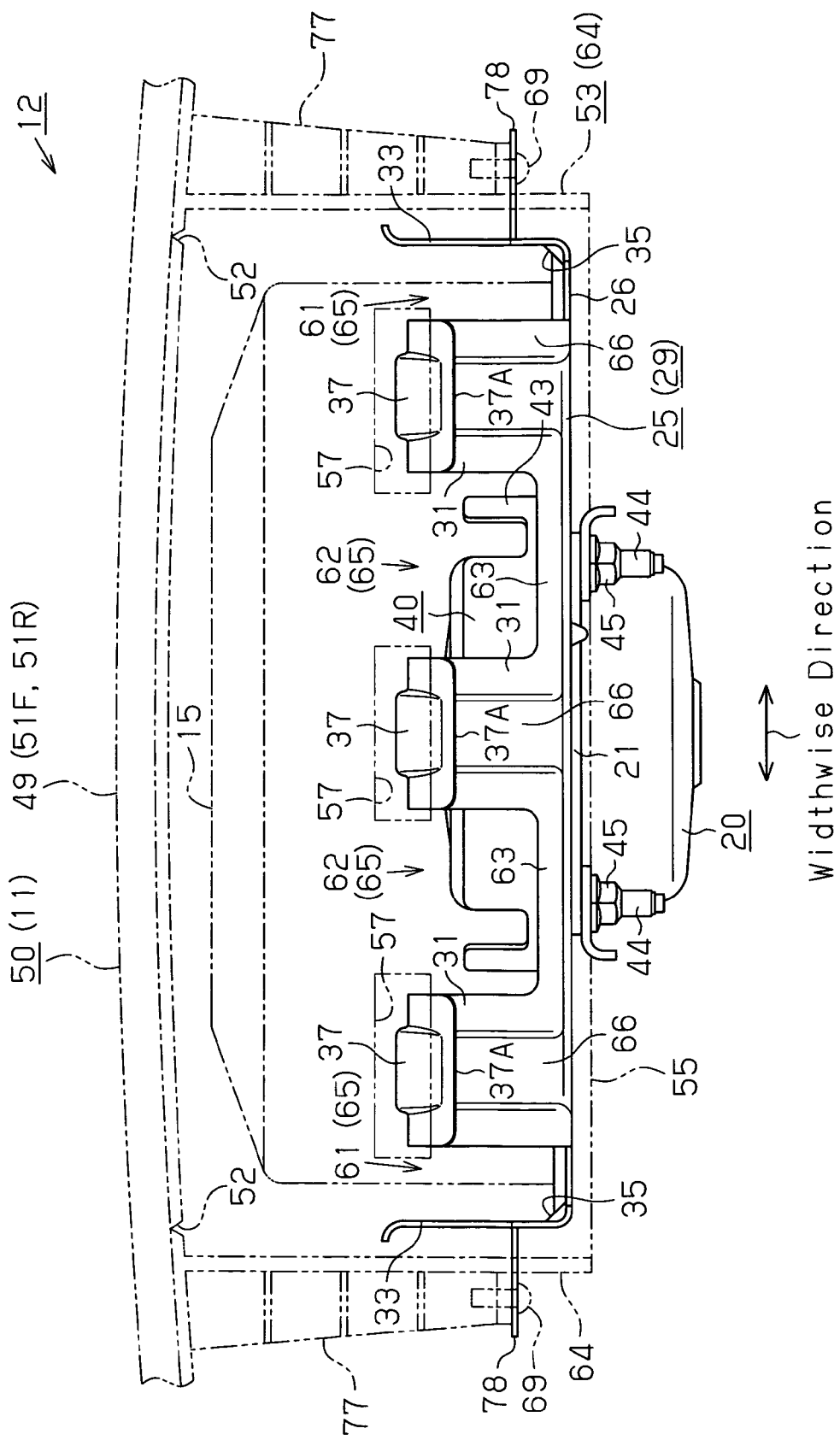

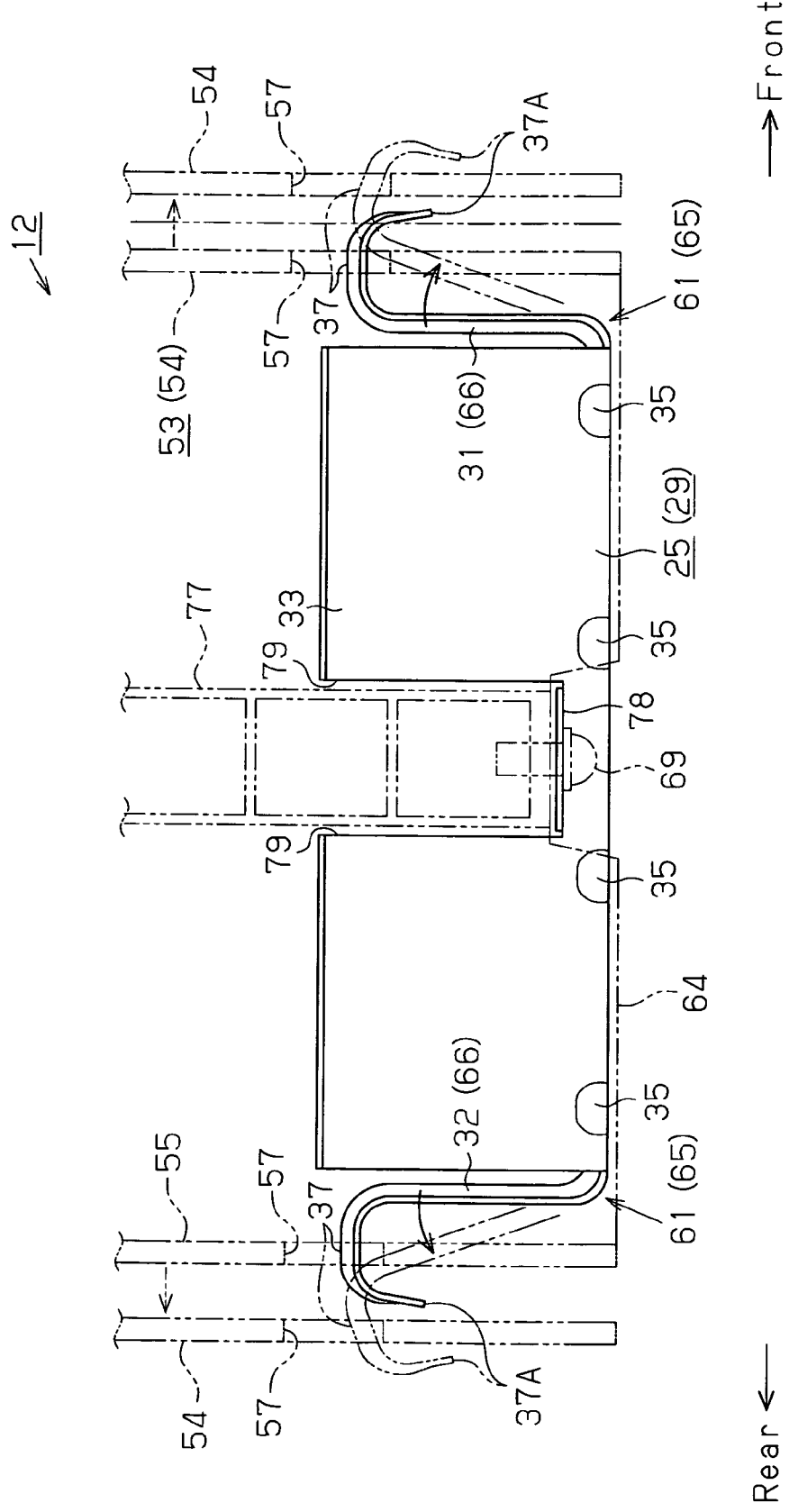

FRONT PASSENGER SEAT AIRBAG APPARATUS

BACKGROUND OF THE INVENTION

The present invention relates to a front passenger seat airbag apparatus that inflates and deploys an airbag in front of a front passenger seat to protect an occupant seated in the seat from an impact caused by a vehicle collision.

As one means for protecting an occupant seated in a front passenger seat when an impact is applied to the vehicle from the front, a front passenger seat airbag apparatus 80 shown in FIGS. 16, 17(A), and 18(A) is known (for example, refer to Japanese Laid-Open Patent Publication No. 2006-88830 and Japanese Laid-Open Patent Publication No. 2008-110737). FIG. 16 illustrates components of the front passenger seat airbag apparatus 80. FIGS. 17(A) and 18(A) are cross-sectional views of an airbag cover 85 of the front passenger seat airbag apparatus 80, showing parts that are engaged with a case 83. These drawings do not show parts other than the engaging parts. The front passenger seat airbag apparatus 80 includes an airbag 81, an inflator 82 for supplying inflation gas to the airbag 81, the case 83 accommodating the airbag 81 and the inflator 82, a retainer 84 for attaching the airbag 81 and the inflator 82 to the case 83, and the airbag cover 85 covering the airbag 81.

The case 83 is formed by processing a single metal plate. The case 83 includes a bottom portion 86 located underneath the airbag 81 and a tubular inner wall portion 87 having a rectangular tube-like structure surrounding the airbag 81. The tubular inner wall portion 87 includes four inner walls 88, 91 extending upward from the bottom portion 86 of the case 83. A pair of the inner walls 88 are arranged at front and rear sides of the tubular inner wall portion 87, so as to face each other. Each inner wall 88 has a plurality of claw portions 89 extending outward. The claw portions 89 are aligned on the surface of the inner wall 88 along a horizontal direction.

The airbag cover 85 is formed by molding resin, and includes a door portion 92 located above the airbag 81 and a tubular outer wall portion 93 located below the door portion 92. The tubular outer wall portion 93 includes a pair of front and rear outer walls 95 facing each other, and another pair of outer walls 96 facing each other in a lateral direction. There are two types of tubular outer wall portion 93: one type has a slit 97 at each corner, or each boundary between adjacent pair of the outer walls 95, 96 (FIGS. 16 and 17(A)); and the other has no such slits (FIG. 18(A)). In either type, the airbag cover 85 surrounds the tubular inner wall portion 87 with the tubular outer wall portion 93 while covering the upper opening of the tubular inner wall portion 87 with the door portion 92. Then, the claw portions 89 of the inner wall 88 are inserted in and engaged with engaging holes 94 formed in the outer wall 96, so that the airbag cover 85 is engaged with the case 83.

When impact is applied from the front to a vehicle equipped with the above described front passenger seat airbag apparatus 80, the inflator 82 supplies inflation gas to the airbag 81 to start inflating and deploying the airbag 81. When the inflation of the airbag 81 opens the door portion 92, the airbag 81 passes through the opening of the door portion 92 and is inflated and deployed between the instrument panel and the occupant in the front passenger seat, thereby protecting the occupant from the impact.

When being inflated and deployed, the airbag 81 applies a high pressure to each part of the case 83 as shown in FIGS. 17(B) and 18(B). The pressure deforms each of the inner walls 88, 91 outward, causing it to bulge outward in an arched shape. The degree of bulging of each inner wall 88, 91 is the smallest at the boundaries B with the adjacent inner walls 91, 88, and increases as the distance from the boundaries B increases. This is because the rigidity of each inner wall 88, 91 is the greatest at the boundaries B and is reduced as the distance from the boundaries B increases.

The high pressure accompanying the inflation and deployment of the airbag 81 is also applied to the tubular outer wall portion 93 of the airbag cover 85. At this time, the tubular outer wall portion 93 is deformed differently when a slit 97 is formed between each adjacent pair of the outer walls 95, 96 (FIG. 17(B)) from when no such slit 97 is formed (FIG. 18(B)). The deformation of the outer walls 95 in the tubular outer wall portion 93 and the deformation of the inner walls 88 in the tubular inner wall portion 87 cause the following problems.

<When the Slits 97 are Formed in the Tubular Outer Wall Portion 93 (FIG. 17(B)>

In this case, the influence of adjacent outer walls 96 on the rigidity of each outer wall 95 is small. Therefore, each outer wall 95 is arched by a bulging amount smaller than that of the inner walls 88 or is deformed outward of the tubular outer wall portion 93 while maintaining the flat shape. Thus, the distance between each inner wall 88 and the corresponding outer wall 95 is the greatest in the vicinity of each boundary B and is reduced as the distance from the boundary B increases. Accordingly, the distance between each claw portion 89 and the corresponding engaging hole 94 (the distance between the distal end of the claw portion 89 and the outer surface of the outer wall 95) is also the greatest in the vicinity of each boundary B and is reduced as the distance from the boundary B increases. As a result, when the airbag 81 is inflated and deployed, the manner in which the claw portions 89 are engaged with the engaging holes 94 greatly vary widely depending on each claw portion 89.

<When No Slit 97 is Formed in the Tubular Outer Wall Portion 93 (FIG. 18(B)>

In this case, each outer wall 95 is deformed to be arched outward of the tubular outer wall portion 93. Since the rigidity of the outer walls 95 made of synthetic resin is lower than the rigidity of the inner walls 88 formed by metal plates, the degree of deformation of each outer wall 95 is greater than the degree of deformation of the arched inner walls 88. Thus, the distance between each claw portion 89 and the corresponding engaging hole 94 is small in the vicinity of each boundary B and is increased as the distance from the boundary B increases. As a result, in this case also, when the airbag 81 is inflated and deployed, the manner in which the claw portions 89 are engaged with the engaging holes 94 greatly vary widely depending on each claw portion 89.

Therefore, even if the balance of the force by which the airbag cover 85 is engaged with the case 83 is maintained among the claw portions 89 when the airbag 81 is not inflated or deployed (FIGS. 17(A) and 18(A)), the balance is disrupted when the airbag 81 is inflated and deployed (FIGS. 17(B) and 18(B)). This can be one of the causes of lowered inflation and deployment performance of the airbag 81. The phenomenon of imbalanced engaging force can commonly occur both in the case in which slits 97 are formed and in the case no such slit is formed.

To prevent the above described phenomenon from occurring, the rigidity of the inner walls 88 may be raised by increasing the thickness of the inner walls 88 or reinforcing the inner walls 88 with other members, so that they are is less susceptible to deformation. In this case, however, the weight of the front passenger seat airbag apparatus 80 is disadvantageously increased.

SUMMARY OF THE INVENTION

Accordingly, it is an objective of the present invention to provide a front passenger seat airbag apparatus with a reduced weight that maintains the balance of engaging force applied to the case of the airbag cover among claw portions even when the airbag is inflated and deployed.

To achieve the foregoing objective and in accordance with one aspect of the present invention, a front passenger seat airbag apparatus installed inside an instrument panel located in front of a front passenger seat is provided. The airbag apparatus includes an airbag, a case for supporting the airbag, and a airbag cover. The case includes a bottom portion located below the airbag and a tubular inner wall portion that surrounds the airbag with three or more inner walls extending upward from the bottom portion. Each of at least two inner walls of the tubular inner wall portion has a plurality of claw portions, which extend at least outward of the inner wall and each have a tip. The claw portions are arranged on the wall surface of the inner wall along a horizontal direction. The airbag cover covers the airbag and the case. The airbag cover includes a lid portion and a tubular outer wall portion. The lid portion forms a part of the instrument panel and covers the tubular inner wall portion. The tubular outer wall portion extends downward from the lid portion and surrounding the tubular inner wall portion. A plurality of engaging holes are formed in the tubular outer wall portion. Each claw portion is inserted in and engaged with one of the engaging holes, so that the airbag cover is engaged with the case. Each of the inner walls on which the claw portions are provided includes a plurality of connected portions to each of which at least one claw portion is connected, and a plurality of non-connected portions to each of which no claw portion is connected. At least one of the non-connected portions has a cutout portion that extends from the upper end of the corresponding inner wall to a position lower than the tip of the corresponding claw portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a front view showing the airbag cover and the case of FIG. 4, as viewed in a direction of arrow A (from the front);

FIG. 6 is a side view showing the airbag cover and the case of FIG. 4, as viewed in a direction of arrow B (from the left);

FIG. 13 is a front view like FIG. 5, showing the airbag cover and the case of FIG. 12;

FIG. 14 is a side view like FIG. 6, showing the airbag cover and the case of FIG. 12;

DETAILED DESCRIPTION OF THE PREFERRED EMBODIMENTS

First Embodiment

A front passenger seat airbag apparatus 12 according to a first embodiment of the present invention will now be described with reference to FIGS. 1 to 7. In the present description, the terms "front-rear direction" and "up-down direction" are used for specifying directions. The front-rear direction is not limited to a horizontal direction, but includes directions slightly inclined relative to a horizontal direction. Also, the up-down direction is not limited to a vertical direction, but includes directions slightly inclined relative to the vertical direction.

Figure 1:
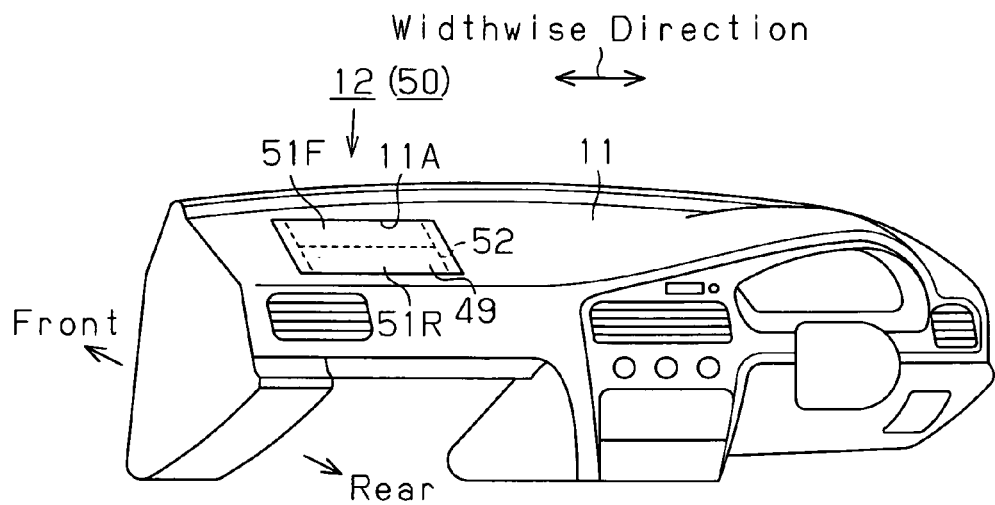
FIG. 1 is a perspective view showing a mounted position of a front passenger seat airbag apparatus according to a first embodiment of the present invention in an instrument panel.
Figure 2:
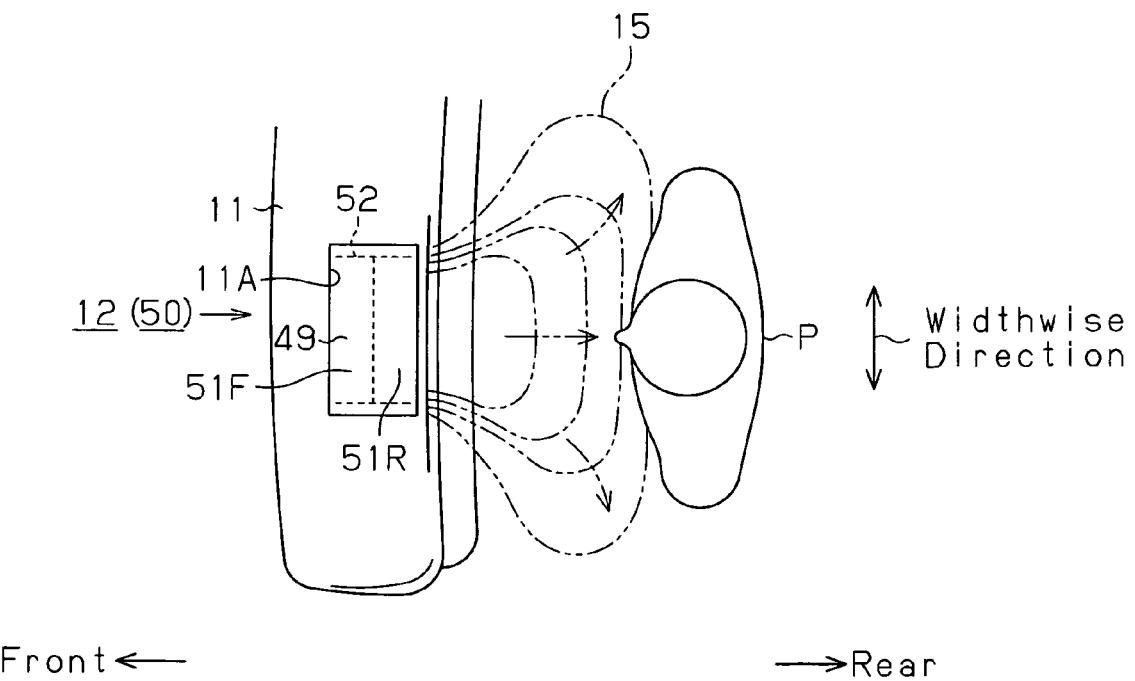
FIG. 2 is a schematic plan view showing an operation of the front passenger seat airbag apparatus of FIG. 1, in which the airbag is inflated and deployed to protect an occupant in the front passenger seat.

In a vehicle, an instrument panel 11 made of synthetic resin is arranged in front of the driver's seat and the front passenger seat as shown in FIGS. 1 and 2. A rectangular opening 11A is formed in the instrument panel 11 at a position in front of an occupant P seated in the front passenger seat (not shown). The opening 11A incorporates a front passenger seat airbag apparatus 12. As shown in FIG. 5, the front passenger seat airbag apparatus 12 includes an airbag 15, an inflator 20 for supplying inflation gas to the airbag 15, a case 25 for supporting the airbag 15 and the inflator 20, a retainer 40 for attaching the airbag 15 and the inflator 20 to the case 25, and an airbag cover 50 covering the airbag 15.

As shown in FIGS. 1 and 2, the airbag cover 50 includes a flat plate-like lid portion 49 covering the opening 11A of the instrument panel 11. In this manner the lid portion 49 forms a part of the instrument panel 11. Most part of the lid portion 49 except the peripheral portion is formed by a pair of front and rear door portions 51F, 51R. That is, on the back side (lower surface) of the lid portion 49, a substantially H-shaped thin breakable portion 52 is formed in a part except the peripheral portion (refer to FIG. 5). The breakable portion 52 divides the lid portion 49 into the front door portion 51F and the rear door portion 51R. When the airbag 15 is inflated and deployed, the breakable portion 52 is broken. Accordingly, the rear door portion 51R is opened rearward using the rear end as a hinge, while the front door portion 51F is opened forward using the front end as a hinge. The breakable portion 52 may have a shape other than the substantially H-shape. For example, the breakable portion 52 may have a substantially U-shape.

Figure 3:
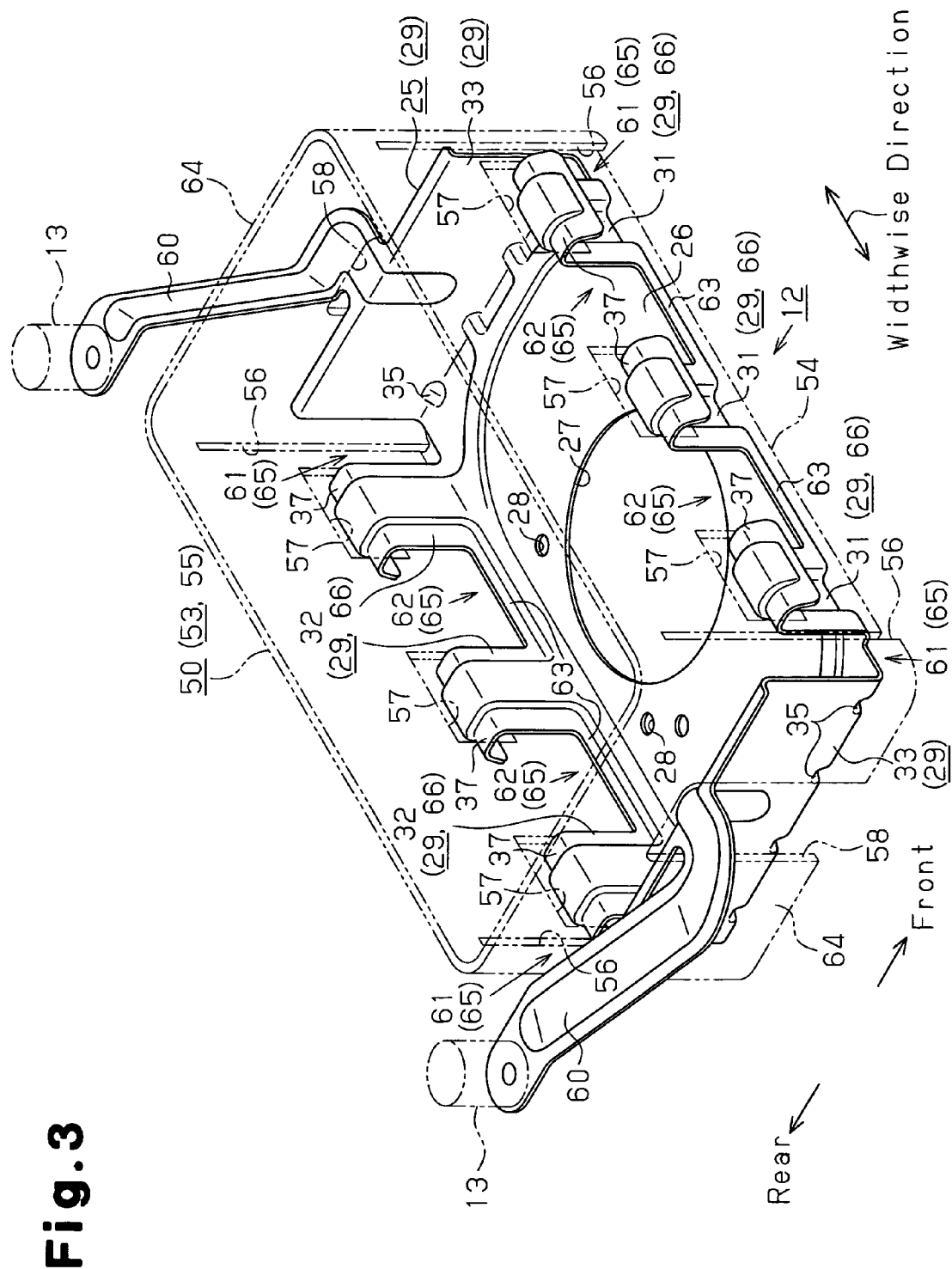
FIG. 3 is a perspective view showing the positional relationship of a tubular outer wall portion, a case, and attachment bosses of an airbag cover in the front passenger seat airbag apparatus shown in FIG. 1.

In addition to the lid portion 49, the airbag cover 50 also includes a tubular outer wall portion 53 (see FIG. 3). The tubular outer wall portion 53 is shaped as a rectangle that is more elongated in the widthwise direction of the vehicle than in the front-rear direction. The tubular outer wall portion 53 will be discussed below.

The airbag 15, which is shown by two-dot chain lines in FIG. 5, is formed like a bag with fabric. The fabric is preferably formed of a material having high strength and flexibility so as to be easily folded. The material may be, for example, woven cloth formed of polyester threads or polyamide threads. The airbag 15 has a size (refer to the two-dot chain line in FIG. 2) that can be inflated and deployed in a space between the instrument panel 11 and the occupant P in the front passenger seat. The airbag 15 is folded into a substantially rectangular parallelepiped and is arranged directly below the door portions 51F, 51R while being wrapped by a wrapping sheet. Although not illustrated, the airbag 15 has at its lower end portion a circular opening for allowing the inflation gas from the inflator 20 to flow into the airbag 15 and attachment holes formed at a number of positions about the opening.

The inflator 20 is a disc type, which is substantially formed like a disc. The inflator 20 accommodates in it gas generating agent (not shown), and generates gas by combustion reaction of the gas generating agent. In place of a type using gas generating agent, the inflator 20 may be a type that breaks a partition wall of a high-pressure gas cylinder filled with a high-pressure gas by a low explosive so as to jet out the gas. A flange 21, by which the inflator 20 is attached to the case 25, extends along the outer periphery of the inflator 20. The flange 21 has a plurality of attachment holes (not shown). The inflator 20 also has a plurality of gas ports (not shown) for discharging the inflation gas. The gas ports are formed in outer circumference above the flange 21.

As shown in FIG. 3, the entire case 25 is formed by a single plate member (steel plate). The case 25 has a bottom portion 26 that extends horizontally below the airbag 15. The bottom portion 26 of the case 25 is shaped as a rectangular plate that is more elongated in the widthwise direction of the vehicle than in the front-rear direction. A circular insertion hole 27 is formed at a center portion of the bottom portion 26 of the case 25. The insertion hole 27 receives a portion of the inflator 20 above the flange 21. Attachment holes 28 are formed in the bottom portion 26 of the case 25, about the insertion hole 27. The attachment holes 28 are located at positions corresponding to attachment holes (not shown) of the inflator 20.

Figure 4:
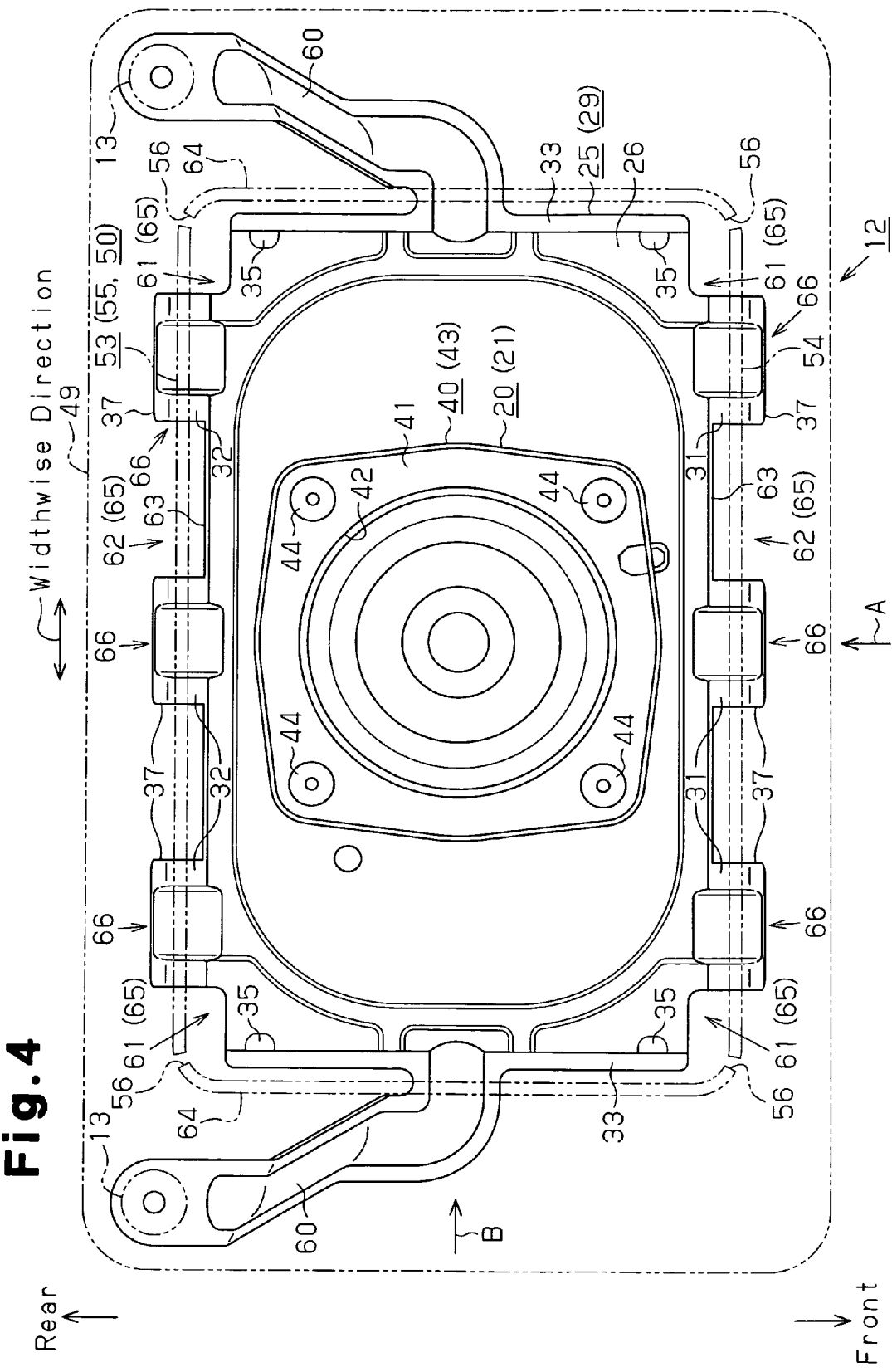
FIG. 4 is a plan view showing the positional relationship of the tubular outer wall portion, the case, and the attachment bosses shown in FIG. 3.

As shown in FIGS. 4 and 5, the retainer 40 for attaching the airbag 15 to the case 25 is formed by a plate (steel plate). The retainer 40 has a bottom portion 41, in which an insertion hole 42 is formed. The insertion hole 42 has substantially the same shape as the insertion hole 27 of the case 25. The retainer 40 also includes a tubular wall portion 43 extending upward from the outer periphery of the bottom portion 41. A bolt 44 extending downward is fastened to each of the four corners of the bottom portion 41 of the retainer 40. With the retainer 40 positioned in the airbag 15, the bolts 44 are inserted in attachment holes of the airbag 15, the attachment holes 28 of the case 25, and the attachment holes of the flange 21 in the inflator 20. A nut 45 is fastened to each bolt 44, so that the airbag 15 and the inflator 20 is fixed to the bottom portion 26 of the case 25. That is, as the nuts 45 are fastened to the bolts 44, the periphery of the opening of the airbag 15 is pressed against the bottom portion 26 of the case 25 through the bottom portion 41 of the retainer 40. Also, as the nuts 45 are fastened, the flange 21 of the inflator 20 is pressed against the bottom portion 26 of the case 25 at the periphery of the insertion hole 27.

On the other hand, a reinforcement (not shown) serving as a vehicle body reinforcing member is provided in the vicinity of a position below the bottom portion 26 of the case 25 in the vehicle body. The bottom portion 26 of the case 25 is fixed to the reinforcement with a bracket (not shown) attached to the bottom portion 26.

As shown in FIG. 3, the case 25 has a tubular inner wall portion 29 in addition to the bottom portion 26. The tubular inner wall portion 29 is shaped like a rectangular tube with an upper opening. The tubular inner wall portion 29 includes four inner walls extending upward from the bottom portion 26 of the case 25, and surrounds the airbag 15. Among the four inner walls, a pair of the inner walls that face each other in the front-rear direction of the vehicle have a different shape from a pair of the inner walls that face each other in the widthwise direction of the vehicle. A pair of the inner walls facing each other in the front-rear direction of the vehicle are defined as a front inner wall 31 and a rear inner wall 32, while the inner walls facing each other in the widthwise direction of the vehicle are defined as side inner walls 33.

The side inner walls 33 are formed by bending upward side edges in the widthwise direction of the bottom portion 26 of the case 25. Each side inner wall 33 is shaped as a rectangle that is more elongated in the front-rear direction than in the up-down direction. The side inner walls 33 face each other to surround the lower portion of the airbag 15 from both sides in the widthwise direction of the vehicle (see FIG. 5).

A plurality of reinforcing portions 35 extend along the front-rear direction at each boundary (bent portion) between the bottom portion 26 of the case 25 and each side inner wall 33. Each reinforcing portion 35 is formed by deforming a part of the boundary so as to bulge into the case 25. The reinforcing portions 35 raise the rigidity of the boundaries between the side inner walls 33 and the bottom portion 26. Thus, when an unexpectedly great pressure is applied to the side inner walls 33 during inflation and deployment of the airbag 15, the reinforcing portions 35 prevent the side inner walls 33 from being excessively deformed outward in the widthwise direction.

As shown in FIGS. 3 and 6, the front inner wall 31 is formed by bending upward the plate at the front edge of the bottom portion 26 of the case 25. Likewise, the rear inner wall 32 is formed by bending upward the plate at the rear edge of the bottom portion 26 of the case 25. The front inner wall 31 and the rear inner wall 32 are arranged to face each other and have substantially the same heights. The heights of the front inner wall 31 and the rear inner wall 32 are set to be nearly equal to the height of the side inner walls 33. The heights of the side inner walls 33 are preferably equal to each other, but may be different. Further, the height of the front inner wall 31 and the rear inner wall 32 may be different from the height of the side inner walls 33.

A plurality of (three) claw portions 37 are formed at the upper end the front inner wall 31. In the present embodiment, the claw portions 37 are arranged substantially along a horizontal direction and along the wall surface of the front inner wall 31. Likewise, a plurality of (three) claw portions 37 are formed at the upper end of the rear inner wall 32. In the present embodiment, the claw portions 37 of the rear inner wall 32 are arranged substantially along a horizontal direction and along the wall surface of the rear inner wall 32. The direction along which the claw portions 37 are arranged is the direction along which the side inner walls 33 face each other, which direction is the vehicle widthwise direction in the first embodiment. The claw portions 37 of the front inner wall 31 and the claw portions 37 of the rear inner wall 32 are arranged at facing positions with respect to the front-rear direction of the vehicle. That is, in the vehicle front-rear direction, the claw portions 37 in each facing pair in the vehicle front-rear direction are at the same position with respect to the vehicle widthwise direction and the up-down direction. The front claw portions 37 extend forward, or outward of the front inner wall 31, from the upper end of the front inner wall 31, and are then bent downward. Also, the rear claw portions 37 extend rearward, or outward of the rear inner wall 32, from the upper end of the rear inner wall 32, and are then bent downward. Because of the above described shape of each claw portion 37, the tip 37A of each claw portion 37 is located at a position lower than the highest position of the claw portion 37.

As described above, the airbag cover 50 includes the lid portion 49, which includes the front and rear door portions 51F, 51R, and the tubular outer wall portion 53, which is shaped as a rectangle. The tubular outer wall portion 53 will now be described.

As shown in FIGS. 3 and 5, the tubular outer wall portion 53 extends downward from an area surrounding the front and rear door portions 51F, 51R in the lid portion 49. The tubular outer wall portion 53 is formed of synthetic resin integrally with the lid portion 49. With the upper opening of the tubular inner wall portion 29 of the case 25 covered with the lid portion 49, the tubular outer wall portion 53 is separated from and surrounds the tubular inner wall portion 29. This arrangement is selected to facilitate the assembly of the airbag cover 50 with the case 25. That is, when assembling the airbag cover 50 with the case 25, the tubular inner wall portion 29 of the case 25 is easily inserted in the tubular outer wall portion 53 of the airbag cover 50. To distinguish parts of the rectangular tubular outer wall portion 53, the names of parts of the tubular outer wall portion 53 are defined as follows. Of portions that face each other in the front-rear direction of the vehicle, a front portion is defined as a front outer wall 54, and a rear portion is defined as a rear outer wall 55. Portions face each other in the widthwise direction of the vehicle are defined as side outer walls 64.

A slit 56 is formed in each of the four corners of the tubular outer wall portion 53, that is, the two boundaries between the front outer wall 54 and the side outer walls 64 and the two boundaries between the rear outer wall 55 and the side outer walls 64. Each slit 56 extends upward from the lower end of the corresponding boundary. The slits 56 disconnect the front outer wall 54 from the adjacent side outer walls 64. The influence of the side outer walls 64 on the rigidity of the front outer wall 54 is smaller than a case where no slit 56 is provided and the front outer wall 54 is connected to the side outer walls 64. Likewise, the slits 56 disconnect the rear outer wall 55 from the adjacent side outer walls 64. The influence of the side outer walls 64 on the rigidity of the rear outer wall 55 is smaller than a case where no slit 56 is provided and the rear outer wall 55 is connected to the side outer walls 64.

In each of the front outer wall 54 and the rear outer wall 55, a plurality of (three) engaging holes 57 are formed in an intermediate portion with respect to the up-down direction. The engaging holes 57 are separated from one another in the widthwise direction of the vehicle. Each engaging hole 57 is an elongated hole, which extends in the vehicle widthwise direction. The airbag cover 50 is engaged with the case 25 by inserting and engaging the claw portions 37 in the engaging holes 57. The engagement ensures the coupling between the airbag cover 50 and the case 25. Therefore, when inflated and deployed, the airbag 15 smoothly pushes up the front and rear door portions 51F, 51R to break the breakable portion 52.

Further, as shown in FIGS. 3 and 6, attachment bosses 13 are provided on the back surface (lower surface) of the lid portion 49. Each attachment boss 13 is located outside of the rear outer wall 55 in the vehicle widthwise direction. Each attachment boss 13 and the corresponding side inner wall 33 of the case 25 are coupled to each other by a fitting bracket 60. The fitting brackets 60 are formed integrally with the case 25 from the same plate. The front end of each fitting bracket 60 connected to the upper end of the corresponding side inner wall 33. Each fitting bracket 60 extends from the corresponding side inner wall 33, is passed through a recess 58 formed in the lower portion of the corresponding side outer wall 64, and extends outward from the tubular outer wall portion 53. Each fitting bracket 60 is fastened to the corresponding attachment boss 13 with a screw 59.

Figure 7A:
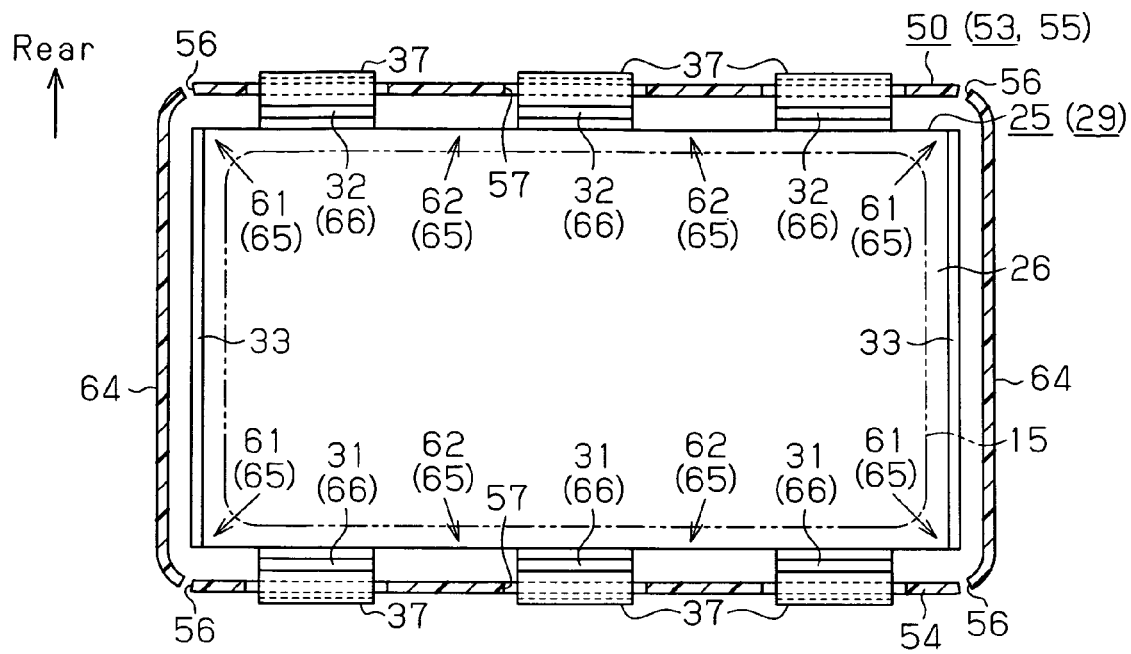
FIG. 7(A) is a diagram for explaining an operation of the front passenger seat airbag apparatus of FIG. 1, providing a schematic cross-sectional plan view only showing portions of the airbag cover engaged with the case when the airbag is not inflated or deployed.

Further, as shown in FIGS. 3, 6, and 7(A), parts of the front inner wall 31 in which the claw portions 37 are provided along the lateral direction in the tubular inner wall portion 29 of the case 25 are defined as follows. To distinguish between portions to which the claw portions 37 are connected and portions to which the claw portions 37 are not connected, the former is defined as a connected portion 66, and the latter is defined as a non-connected portion 65. Since a plurality of (three) claw portions 37 are provided on the front inner wall 31, the number of the connected portions 66 is the same as that of the claw portions 37 (three), and the number of the non-connected portions 65 is one more than that of the claw portions 37 (four).

Two cutout portions 61 and two cutout portions 62 are provided in the four non-connected portions 65 in the front inner wall 31. In the first embodiment, the cutout portions 61 are provided in the non-connected portions 65 at the ends in the arrangement direction of the claw portions 37. The non-connected portions 65 at the ends are each located between one of the connected portions 66 at the ends in the direction in which the claw portions 37 are arranged and the adjacent side inner wall 33. In other words, the non-connected portions 65 at the ends are located at the boundaries between the connected portions 66 at the ends and the adjacent side inner walls 33. Among the four non-connected portions 65 of the rear inner wall 32, a cutout portion 61 is provided in each of the two non-connected portions 65 at both ends in the arrangement direction of the claw portions 37.

Each cutout portion 61 extends from the upper end of the corresponding one of the upper end the front and rear inner walls 31, 32 to a position lower than the tip 37A of the corresponding claw portion 37. In the first embodiment, each cutout portion 61 reaches the bottom portion 26 in the corresponding non-connected portion 65. Since the cutout portions 61 are provided, the front inner wall 31, the rear inner wall 32, and the side inner walls 33 are each supported by the bottom portion 26 only at its lower end. That is, each of the inner walls 31, 32, 33 is supported in a cantilever-like manner.

Each of the non-connected portions 65 located at an intermediate position with respect to the arrangement direction of the claw portions 37 also has a cutout portion 62. The non-connected portions 65 located at an intermediate position refer to the non-connected portions 65 other than the non-connected portions 65 at both ends. The non-connected portions 65 located at an intermediate position include at least two non-connected portions 65 in the vicinity of the center portion with respect to the arrangement direction of the claw portions 37. In this manner, a cutout portion 62 is formed in the non-connected portion 65 between each adjacent pair of the claw portions 37 in the front inner wall 31, and also in the non-connected portion 65 between each adjacent pair of the claw portions 37 in the rear inner wall 32. Since the front inner wall 31 has three claw portions 37 and four non-connected portions 65, two cutout portions 62 are formed in the front inner wall 31. Also, since the rear inner wall 32 has three claw portions 37 and four non-connected portions 65, two cutout portions 62 are formed in the rear inner wall 32. Each cutout portion 62 extends from the upper end of the corresponding one of the front and rear inner walls 31, 32 to a position lower than the tip 37A of the corresponding claw portion 37. In the first embodiment, each cutout portion 62 substantially reaches the bottom portion 26 in the corresponding non-connected portion 65, or reaches a position slightly (approximately 1 to 5 mm) above the bottom portion 26. This leaves a remaining portion 63 between the lower end of the cutout portion 62 and the bottom portion 26. The remaining portions 63 having a height of about 1 to 5 mm are formed so that bent portions have no wrinkles or cracks in the bending process. Specifically, when forming the case 25, a metal flat plate, which is a raw material, is punched to obtain a general shape. When subjecting the punched plate to bending, both ends of the bent portion of each non-connected portion 65 are made continuous to the adjacent connected portions 66. This facilitates the bending of the non-connected portion 65. As a result, the finishing of both ends of the non-connected portion 65 is improved.

As described above, the front inner wall 31 has the cutout portions 62 provided in the non-connected portions 65 other than the ones at both ends in the arrangement direction of the claw portions 37. Accordingly, the three connected portions 66 in the front inner wall 31 are disconnected from each other. Likewise, the rear inner wall 32 has the cutout portions 62 provided in the non-connected portions 65 other than the ones at both ends in the arrangement direction of the claw portions 37. Accordingly, the three connected portions 66 in the rear inner wall 32 are disconnected from each other.

Figure 7B:
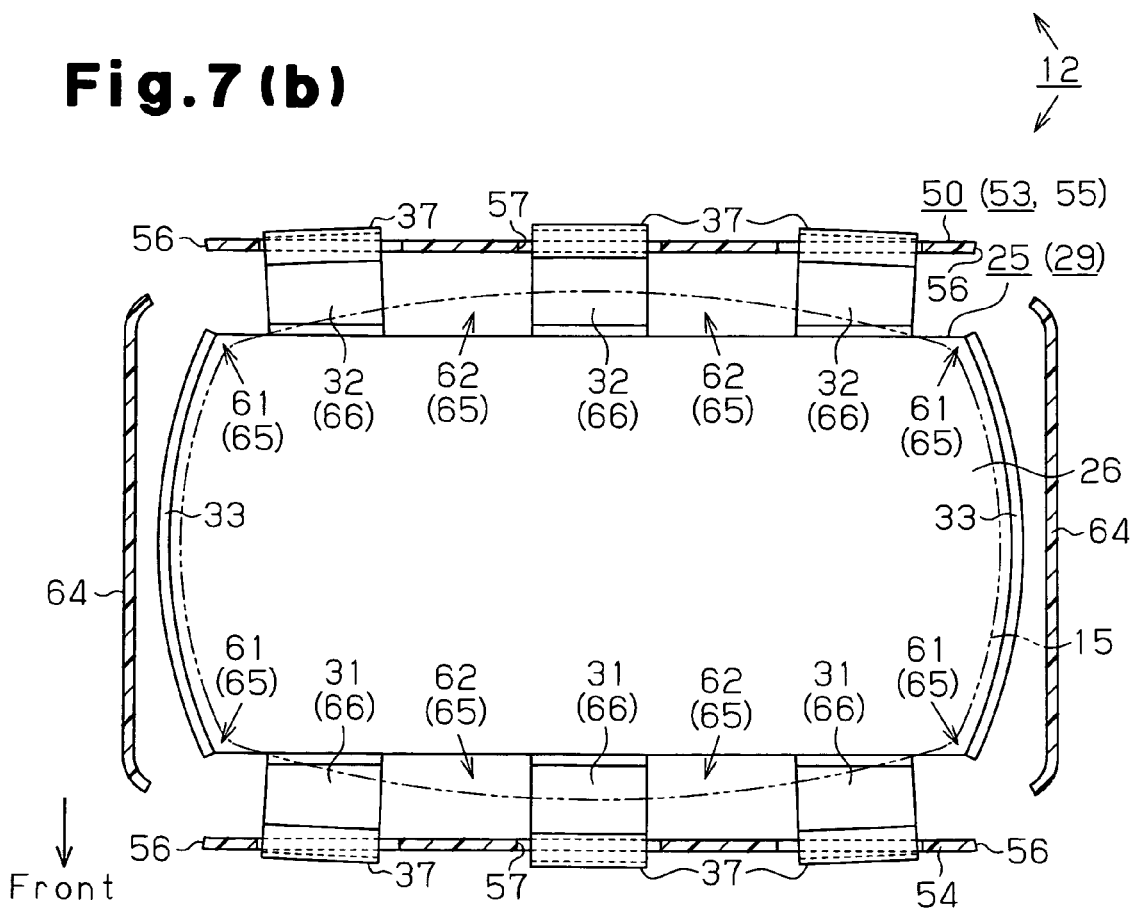
FIG. 7(B) is a schematic cross-sectional plan view only showing the portions of the airbag cover engaged with the case when the airbag is inflated and deployed.

Next, an operation of the front passenger seat airbag apparatus 12 according to the first embodiment will be described with reference to FIGS. 7(A) and 7(B). Specifically, a case where the airbag 15 is not inflated or deployed and the a case where the airbag 15 is inflated and deployed will be separately explained. FIGS. 7(A) and 7(B) only show portions of the airbag cover 50 that are engaged with the case 25, and the other parts are omitted. FIG. 7(A) shows the engaging portions when the airbag 15 is not inflated or deployed, and FIG. 7(B) shows the engaging portions when the airbag 15 is inflated and deployed.

<When the Airbag 15 is not Inflated or Deployed>

In this state, since no inflation gas supplied to the airbag 15 as shown in FIG. 7(A), a high pressure accompanying inflation and deployment of the airbag 15 is not applied to the tubular inner wall portion 29 or the tubular outer wall portion 53. In the tubular inner wall portion 29, the front inner wall 31, the rear inner wall 32, and the side inner walls 33 are all maintained to be flat. The connected portions 66 and the non-connected portions 65 in the front inner wall 31 and the rear inner wall 32 are also maintained to be flat. Also, in the tubular outer wall portion 53, the front outer wall 54, the rear outer wall 55, and the side outer walls 64 are all maintained to be flat. Therefore, in the tubular inner wall portion 29 and the tubular outer wall portion 53, the front inner wall 31, the rear inner wall 32, and the side inner walls 33 are arranged parallel with the front outer wall 54, the rear outer wall 55, and the side outer walls 64, respectively. Accordingly, the claw portions 37 of the connected portions 66 in the front inner wall 31 are arranged on a straight line along the widthwise direction of the vehicle, and so are the claw portions 37 of the connected portions 66 in the rear inner wall 32. The distances between the claw portions 37 of the connected portions 66 in the front inner wall 31 and the engaging holes 57, in which the claw portions 37 are inserted and engaged, in the front outer wall 54 (that is, the distance between the tip 37A of the claw portion 37 and the outer surface of the front outer wall 54) are substantially uniform. Further, the distances between the claw portions 37 of the connected portions 66 in the rear inner wall 32 and the engaging holes 57, in which the claw portions 37 are inserted and engaged, in the rear outer wall 55 (that is, the distance between the tip 37A of the claw portion 37 and the outer surface of the rear outer wall 55) are substantially uniform. The manner in which the claw portions 37 are engaged with the engaging holes 57 do not vary widely depending on each claw portion 37.

<When the Airbag 15 is Inflated and Deployed>

When impact is applied to the vehicle from the front, the inflator 20 supplies inflation gas to the airbag 15 to start inflating and deploying the airbag 15. When being inflated and deployed, the airbag 15 breaks the breakable portion 52. Accordingly, the rear door portion 51R is opened rearward using the rear end as a hinge, while the front door portion 51F is opened forward using the front end as a hinge. The airbag 15 passes through the space between the open door portions 51F, 51R and is inflated and deployed into a space above the instrument panel 11, thereby protecting the occupant P seated in the front passenger seat (see two-dot chain lines in FIG. 2).

At this time, the airbag 15, which is shown by two-dot chain lines in FIG. 7(B), applies a high pressure to parts of the case 25. In the tubular inner wall portion 29, the applied pressure generates forces that push the front inner wall 31 and the rear inner wall 32 outward of the tubular inner wall portion 29 (the front inner wall 31 is pressed forward, and the rear inner wall 32 is pressed rearward). Accordingly, the front inner wall 31 and the rear inner wall 32 are deformed to have arched shapes.

The tubular outer wall portion 53 of the airbag cover 50 includes a slit 56 at each of the boundaries between the front outer wall 54 and the side outer walls 64. Thus, the influence of the side outer walls 64 on the rigidity of the front outer wall 54 is less than that in the case where the front outer wall 54 is connected to the side outer walls 64. Likewise, a slit 56 is formed at each of the boundaries between the rear outer wall 55 and the side outer walls 64. Thus, the influence of the side outer walls 64 on the rigidity of the rear outer wall 55 is less than that in the case where the rear outer wall 55 is connected to the side outer walls 64.

Therefore, when the tubular outer wall portion 53 receives a high pressure accompanying the inflation and deployment of the airbag 15, the front outer wall 54 and the rear outer wall 55 are inclined outward with the upper ends of the tubular outer wall portion 53 as fulcrums as shown by arrows of two-dot chain lines (the front outer wall 54 being inclined forward, and the rear outer wall 55 being inclined rearward). Further, each of the front outer wall 54 and the rear outer wall 55 is deformed to have an arched shape by a small bulging amount, so that it bulges slightly greater at a center portion than at both ends with respect to the vehicle widthwise direction. Alternatively, each of the front outer wall 54 and the rear outer wall 55 is deformed while maintaining the flat shape (refer to FIG. 7(B)).

The space between each claw portion 37 and the corresponding engaging hole 57 is great at both ends and small in the vicinity of the center portion with respect to the arrangement direction of the claw portions 37. As a result, when the airbag 15 is inflated and deployed, the manner in which the claw portions 37 are engaged with the engaging holes 57 greatly vary widely depending on each claw portion 37.

In the first embodiment, since each of the non-connected portions 65 at both ends in the arrangement direction of the claw portions 37 has a cutout portion 61, each of the connected portions 66 at both ends in the arrangement direction is disconnected from the corresponding side inner wall 33. In this respect, the case 25 of the first embodiment has a different structure from the case of the prior art airbag apparatus described in the BACKGROUND OF THE INVENTION. In the case of the prior art airbag apparatus, since each inner wall is connected to the adjacent inner walls, the rigidity of each inner wall is significantly influenced by the adjacent inner walls. In contrast, according to the first embodiment, the side inner walls 33 have a small influence on the rigidity of the connected portions 66 at the ends in the arrangement direction of the claw portions 37. In the front inner wall 31 and the rear inner wall 32, the connected portions 66 at the ends in the arrangement direction are more easily deformed compared to the case of the prior art airbag apparatus (in which an inner wall is connected to the adjacent side inner walls via non-connected portions having no cutout portions).

Thus, as the airbag 15 is inflated and deployed, the connected portions 66 in the front inner wall 31 and the rear inner wall 32 follow the deformation of the tubular outer wall portion 53 (deformation with a small bulging amount into arched shapes or deformation while being maintained to be flat). That is, as illustrated by arrows of solid lines in FIG. 6, each connected portion 66 is inclined outward with its lower end as a fulcrum. Further, the set of the three connected portions 66 in the front inner wall 31 and the set of the three connected portions 66 in the rear inner wall 32 are each deformed to form a shallow arch, that is, an arched shape shallower than the case of the prior art airbag apparatus (refer to FIG. 7(B)).

Accordingly, as shown in FIG. 7(B), the distance between each of the claw portions 37 located at the ends in the arrangement direction and the corresponding engaging holes 57 is reduced. As a result, the distance between the claw portions 37 at both ends and the corresponding engaging holes 57 approaches the original short distance between the claw portions 37 in the vicinity of the center portion with respect to the arrangement direction and the corresponding engaging holes 57. The variation of the distance between the claw portions 37 and the corresponding engaging holes 57 is less than that in the case of the prior art airbag apparatus (in which the connected portions at both ends in the arrangement direction are connected to the adjacent side inner walls via non-connected portions having not cutout portions).

As a result, when the airbag 15 is inflated and deployed, the manner in which the claw portions 37 are engaged with the engaging holes 57 do not vary widely as in the case where the airbag 15 is not inflated or deployed.

In each of the front inner wall 31 and the rear inner wall 32 of the tubular inner wall portion 29, the lower the positions of the lower ends of the cutout portions 61, the smaller the influence of the adjacent side inner walls 33 on the rigidity of the connected portions 66 at both ends in the arrangement direction of the claw portions 37 becomes. This is because each connected portion 66 and the adjacent side inner wall 33 is disconnected by the corresponding cutout portion 61 to a relatively low position. As the influence is reduced in this manner, the connected portions 66 at both ends in the arrangement direction are easily deformed when the high pressure of the airbag 15 being inflated and deployed is applied.

In this respect, each cutout portion 61 of the first embodiment reaches the bottom portion 26 of the case 25 in the corresponding non-connected portion 65, or the lowest possible position of the cutout portion 61. Therefore, in each of the front inner wall 31 and the rear inner wall 32, the connected portions 66 at both ends in the arrangement direction are easily deformed, so that the front inner wall 31 and the rear inner wall 32 are more reliably follow the deformation of the front outer wall 54 and the rear outer wall 55 of the tubular outer wall portion 53. Therefore, the entire tubular outer wall portion 53 is deformed along a further shallow arch as the airbag 15 is inflated and deployed. As a result, the variation of the distance between the claw portions 37 and the corresponding engaging holes 57 is reduced. As a result, the manner in which the claw portions 37 are engaged with the engaging holes 57 varies less widely.

Further, each of the front inner wall 31 and the rear inner wall 32 has a plurality of (three) connected portions 66. Also, each of a plurality of (two) non-connected portions 65 located in an intermediate portion with respect to the arrangement direction of claw portions 37 except the ones at both ends also has a cutout portion 62. Since each of the three connected portions 66 is disconnected from the adjacent connected portions 66 by the cutout portions 62, the connected portions 66 are deformed independently from each other. The influence of each connected portion 66 on the rigidity of an adjacent connected portion 66 is less than that in the case where no cutout portion 62 is provided in the non-connected portion 65 between the connected portions 66. Each connected portion 66 is more likely to be deformed following deformation of the front outer wall 54 and the rear outer wall 55 of the tubular outer wall portion 53 than in the case where no cutout portion 62 is formed in the non-connected portions 65 between the connected portions 66. This reduces the variation of the distance between the claw portions 37 and the corresponding engaging holes 57 when the airbag 15 is inflated and deployed. Accordingly, the variation in the manner in which the claw portions 37 are engaged with the engaging holes 57 is smaller than that of the case of the prior art airbag apparatus (in which no cutout portion is formed in the non-connected portions between the connected portions).

The lower the positions of the lower ends of the cutout portions 62, the smaller the influence of each connected portion 66 in the intermediate portion with respect to the arrangement direction of the claw portions 37 on an adjacent connected portion 66 becomes. This is because each adjacent pair of the connected portions 66 are disconnected from each other by a cutout portion 62 to a low position. Therefore, when receiving a high pressure from the airbag 15 being inflated and deployed, the connected portions 66 in the intermediate portion are readily deformed.

In this respect, in the first embodiment, each cutout portion 62 reaches a position slightly above the bottom portion 26 of the case 25 in the corresponding non-connected portion 65, or a position near the lowest possible position of the cutout portion 62 (position reaching the bottom portion 26). Therefore, each connected portion 66 is more readily deformed, following the deformation of the front outer wall 54 and the rear outer wall 55 of the tubular outer wall portion 53. As a result, the variation of the distance between the claw portions 37 and the corresponding engaging holes 57 is reduced. Accordingly, the manner in which the claw portions 37 are engaged with the engaging holes 57 varies less widely.

The weight of the front passenger seat airbag apparatus 12 is reduced compared to the prior art airbag apparatus because of the following points.

(i) As a comparison example, the case of a tubular inner wall portion 29 having no cutout portion 61 will be discussed. In this case, the tubular inner wall portion 29 of the case 25 has a rectangular box-like shape with a bottom portion 26, a front inner wall 31, a rear inner wall 32, and side inner walls 33 are coupled together. To form such a tubular inner wall portion 29, each of the front inner wall 31 and the rear inner wall 32 needs to be connected to the adjacent side inner walls 33, in addition to erecting the front inner wall 31 an the rear inner wall 32 from the bottom portion 26. Therefore, overlapping portion needs to be provided between each of the front and rear inner walls 31, 32 and the adjacent side inner walls 33, and the front inner wall 31 and the rear inner wall 32 need to be fixed to the adjacent side inner walls 33 at the overlapping portions. In this respect, the tubular inner wall portion 29 of the first embodiment can be formed simply by erecting the front inner wall 31, the rear inner wall 32, and the side inner walls 33 from the peripheral portions of the bottom portion 26. That is, the front inner wall 31 and the rear inner wall 32 do not need to be connected to the side inner walls 33. Also, no overlapping portions for fixing need to be provided. The weight of the case 25 is therefore reduced.

(ii) To reduce the variation of the manner in which the claw portions 37 are engaged with the engaging holes 57 when the airbag 15 is inflated and deployed, configurations other than the first embodiment may be employed. To increase the rigidity of the front and rear inner walls 31, 32 so that they are hard to deform, the thickness of the front and rear inner walls 31, 32 may be increased. Alternatively, the front and rear inner walls 31, 32 may be reinforced by reinforcing members. In this case, the weight of the front passenger seat airbag apparatus 12 is disadvantageously increased. However, according to the first embodiment, the rigidity of the front and rear inner walls 31, 32 does not need to be increased so that they are less easily deformed. Therefore, increase in the weight accompanying such configuration is avoided.

(iii) In each of the front and rear inner walls 31, 32, the cutout portions 61 are provided in the non-connected portions 65 at both ends in the arrangement direction of the claw portions 37. Accordingly, the weight of the case 25 is reduced. Since the four cutout portions 61 are provided in the four corners of the tubular inner wall portion 29, the effect of the weight reduction of the cutout portions 61 is considerable.

(iv) Each cutout portion 61 reaches the bottom portion 26. This position is the lowest possible position of each cutout portion 61. Therefore, as the lower end of each cutout portion 61 approaches the bottom portion 26, the cutout portion 61 is elongated and the weight of the case 25 becomes less.

(v) In each of the front and rear inner walls 31, 32, the cutout portions 62 are provided in the non-connected portions 65 at the center portion in the arrangement direction of the claw portions 37. Accordingly, the weight of the case 25 is reduced. Since the two cutout portions 62 are provided in each of the front inner wall 31 and the rear inner wall 32, the effect of the weight reduction of the cutout portions 62 is considerable.

(vi) Each cutout portion 62 extends to a position slightly above (approximately 1 to 5 mm) the bottom portion 26. This position is the lowest possible position of the cutout portion 62 (position reaching the bottom portion 26). Therefore, as the lower end of each cutout portion 62 approaches the bottom portion 26, the cutout portion 62 is elongated and the weight of the case 25 becomes less.

(vii) The claw portions 37 are formed of the same plate (steel plate) as the connected portions 66 in the front and rear inner walls 31, 32. Thus, compared to a case where claw portions are formed by different plates, the weight of the case 25 is reduced. This is because, if the claw portions 37 and the connected portions 66 are formed by separate plates, the claw portions 37 need to have a portion overlapping the connected portions 66 to be fixed thereto, or members for fixing (for example, weld material, adhesive, rivets) are required. In contrast, if the claw portions 37 are formed by the same plate as the connected portions 66, the overlapping portions or separate members for fixing are not needed.

The first embodiment as described above has the following advantages.

(1) In each of the front and rear inner walls 31, 32, the cutout portions 61 are provided in the non-connected portions 65 at both ends in the arrangement direction of the claw portions 37. Each cutout portion 61 extends from the upper end of the corresponding one of the front and rear inner walls 31, 32 to a position lower than the tip 37A of the corresponding claw portion 37. Accordingly, the connected portions 66 at both ends in the arrangement direction are disconnected from the adjacent side inner walls 33. A high pressure accompanying inflation and deployment of the airbag 15 deforms the front outer wall 54 and the rear outer wall 55 outward of the tubular outer wall portion 53 by a small bulging amount, or deformed while maintaining flat shapes. Even if the front outer wall 54 and the rear outer wall 55 are deformed in this manner, the balance of engaging force applied to the case 25 of the airbag cover 50 is maintained as in the case where the airbag 15 is not inflated or deployed. As a result, the inflation and deployment performance of the airbag 15 is improved.

Also, no measures need to be taken for increasing the rigidity of the front and rear inner walls 31, 32 so that they are less easily deformed. Also, the weight of the front passenger seat airbag apparatus 12 is prevented from being increased due to such measures. Further, forming the cutout portions 61 reduces the weight of the case 25, so that the weight of the entire airbag apparatus 12 is reduced.

The advantages of forming the cutout portions 61 are achieved when the lower end of each cutout portion 61 is at least lower than the tips 37A of the claw portions 37.

(2) Each cutout portion 61 reaches the bottom portion 26 in the corresponding non-connected portion 65. Accordingly, the connected portions 66 at both ends in the arrangement direction of the claw portions 37 are more clearly disconnected from the adjacent side inner walls 33. Therefore, the balance of engaging force applied to the case 25 of the airbag cover 50 is maintained in a favorable manner. Also, since each cutout portion 61 is elongated, the weight of the case 25 is further reduced.

(3) In each of the front and rear inner walls 31, 32, a cutout portion 62 is provided in the non-connected portion 65 between the connected portions 66 that are adjacent to each other in the intermediate portion with respect to the arrangement direction of the claw portions 37. Each cutout portion 62 extends from the upper end of the corresponding one of the front and rear inner walls 31, 32 to a position lower than the tip 37A of the corresponding claw portion 37. Therefore, each connected portion 66 is disconnected from the adjacent connected portion 66.

Therefore, the balance of engaging force applied to the case 25 of the airbag cover 50 is maintained in a favorable manner. Further, since a cutout portion 62 is formed in the non-connected portion 65 in the intermediate portion with respect to the arrangement direction, the weigh of the case 25 is further reduced.

The advantages of forming the cutout portions 62 are achieved when the lower end of each cutout portion 62 is at least lower than the tips 37A of the claw portions 37.

(4) Each cutout portion 62 reaches a position slightly above the bottom portion 26 in the corresponding non-connected portion 65. Therefore, each connected portion 66 is clearly disconnected from the adjacent connected portion 66.

Therefore, the balance of engaging force applied to the case 25 of the airbag cover 50 is maintained in a further favorable manner. Also, since each cutout portion 62 is elongated, the weight of the case 25 is further reduced.

(5) In either of the front inner wall 31 and the rear inner wall 32, the claw portions 37 and the connected portions 66 are formed integrally by processing a single plate (steel plate). Therefore, compared to a case where the claw portions 37 and the connected portions 66 are formed separately, the weight of the case 25 is reduced.

The advantages of the above items (1) to (5) are achieved by the first embodiment. However, the airbag cover 50 is not limited the one described above, but may be a type in which the instrument panel 11 and the lid portion 49 are formed integrally. This type of the airbag cover 50 will now be described with reference to FIGS. 8 to 11.

Figure 8:
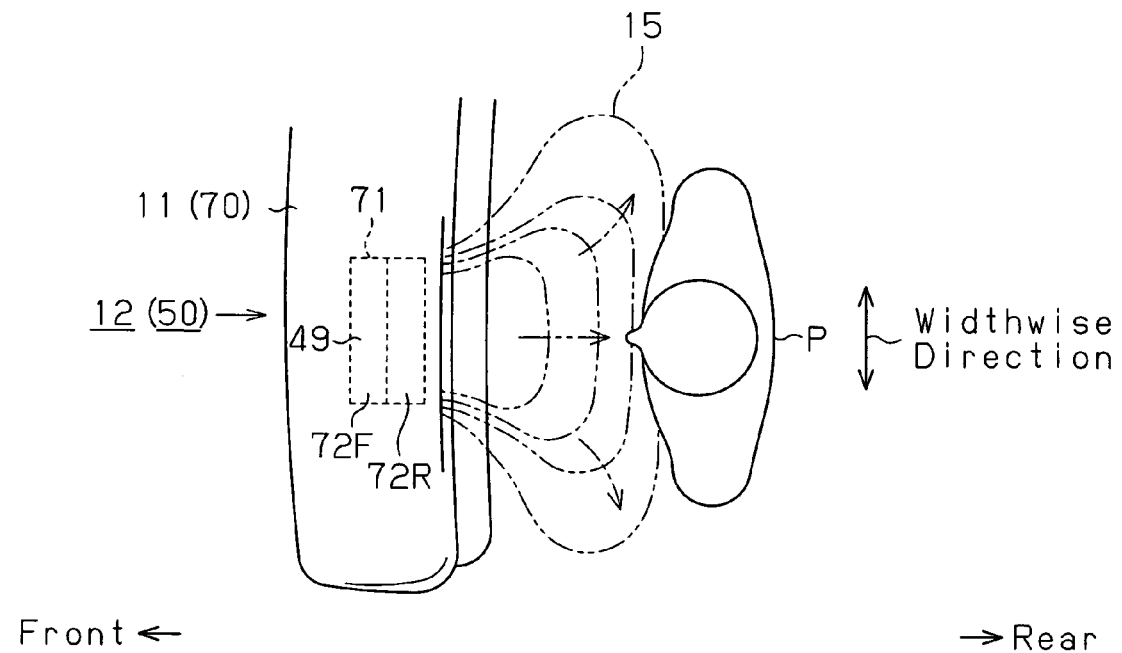
FIG. 8 is a diagram showing a front passenger seat airbag apparatus that uses an airbag cover different from that of the first embodiment, providing a diagrammatic plan view illustrating a state where the airbag of the apparatus is inflated and deployed to protect an occupant in the front passenger seat.
Figure 9:
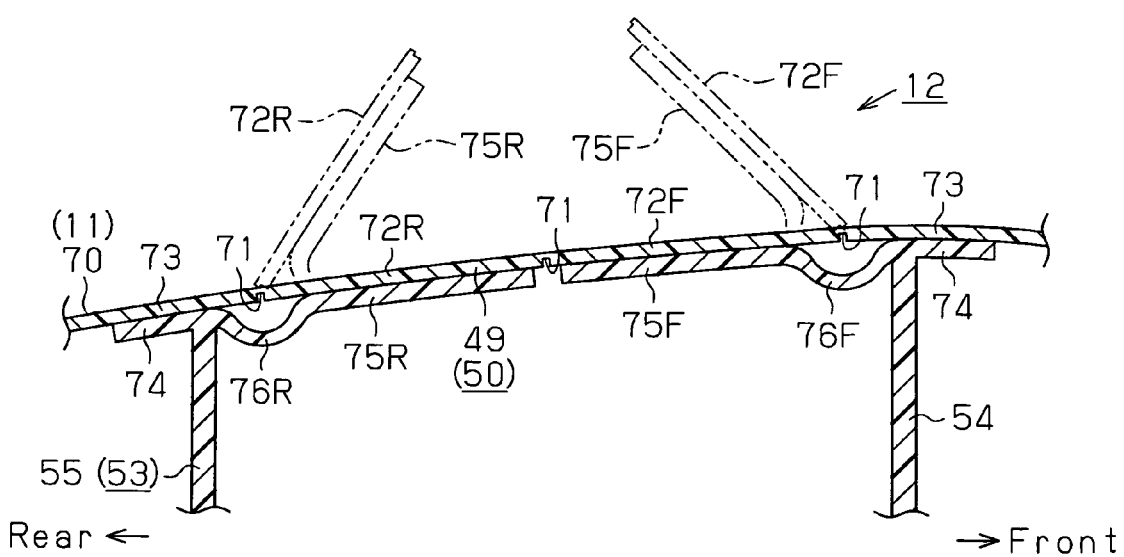
FIG. 9 is a partial cross-sectional view illustrating the structure of the airbag cover of FIG. 9.

As shown in FIGS. 8 and 9, the instrument panel 11 has a single layer having a base member 70 made of hard synthetic resin as a main portion. A breakable portion (tear line) 71 having a shape indicated by chain lines in FIG. 8 is formed on the back surface (lower side as viewed in FIG. 9) of the base member 70.

Figure 10:
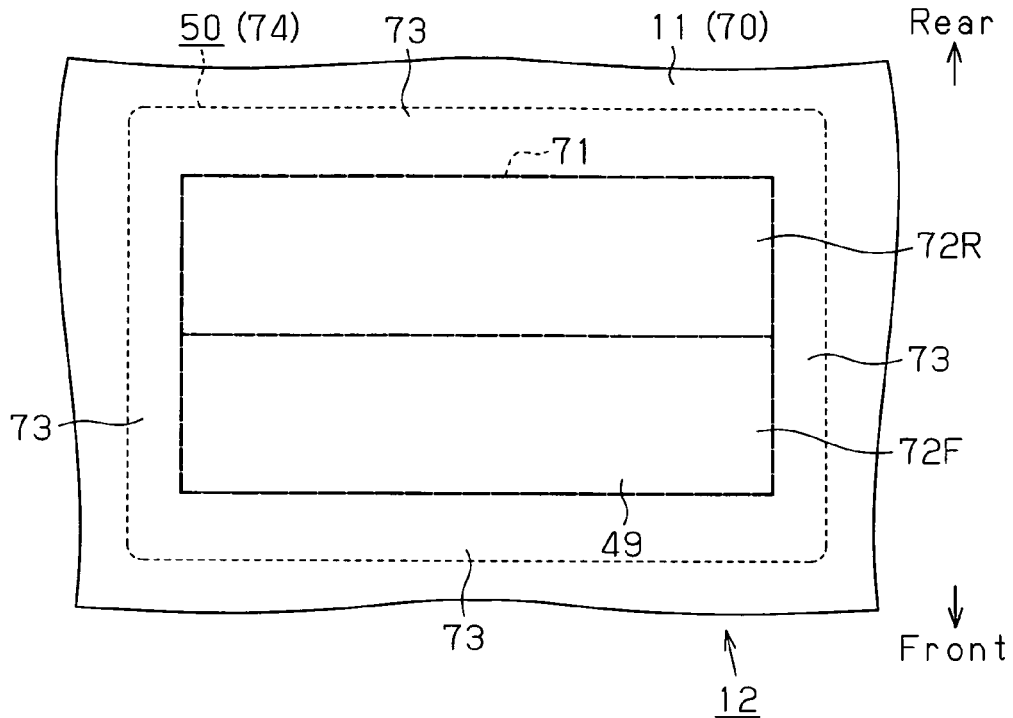
FIG. 10 is a partial plan view illustrating door portions, a door adjacent portion, and a breakable portion in the front passenger seat airbag apparatus of FIG. 9.

As shown in FIGS. 9 and 10, the base member 70 includes a front door portion 72F and a rear door portion 72R, which are defined by the breakable portion 71, and a door adjacent portion 73. The door adjacent portion 73 forms a portion that is outside or and adjacent the breakable portion 71 (a portion surrounding the breakable portion 71).

Figure 11:
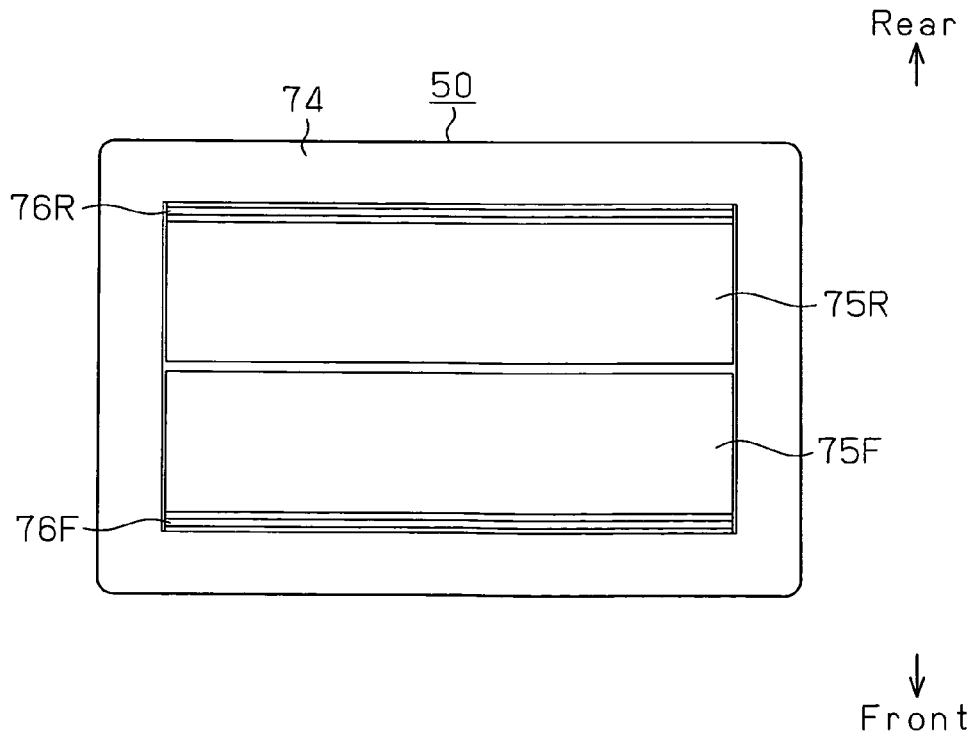
FIG. 11 is a plan view only showing the airbag cover removed from the front passenger seat airbag apparatus of FIG. 9.
Figure 12:
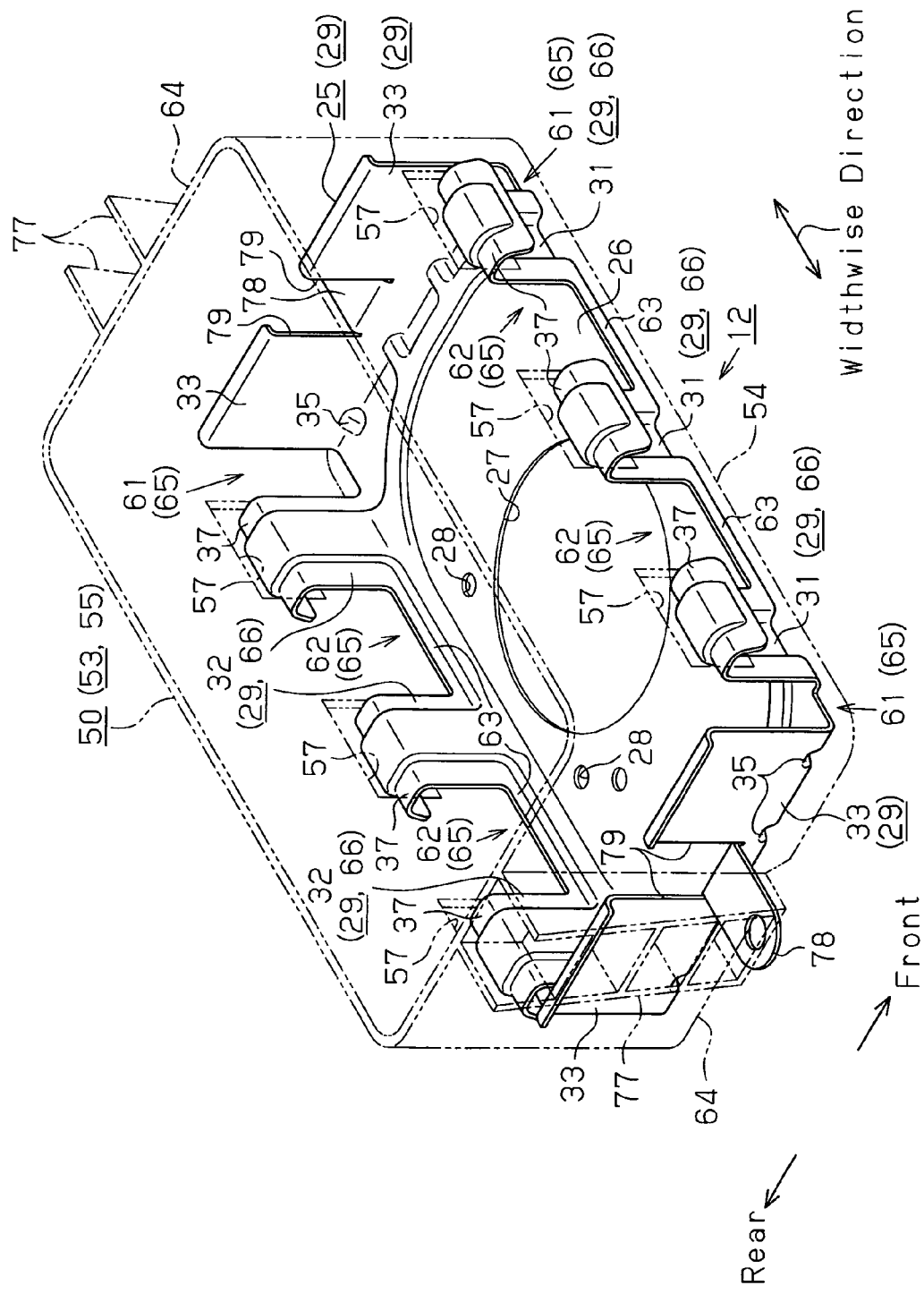
FIG. 12 is a perspective view showing the positional relationship of a tubular outer wall portion, a case, and attachment bosses of an airbag cover according to a second embodiment of the present invention.

An airbag cover 50 made of synthetic resin is provided on the back side of the front and rear door portions 72F, 72R and the door adjacent portion 73. As shown in FIGS. 9 and 11, the airbag cover 50 includes a frame portion 74, a pair of front and rear door support portions 75F, 75R, and a pair of front and rear hinge portions 76F, 76R.

The frame portion 74 is a rectangular frame that is extended along the widthwise direction of the vehicle and corresponds to the door adjacent portion 73. The frame portion 74 is joined to the back side of the door adjacent portion 73 by joining means such as vibration welding, so as to reinforce the door adjacent portion 73 from the back side.

Each of the door support portions 75F, 75R is a rectangular plate that is extended along the widthwise direction of the vehicle. The door support portions 75F, 75R are arranged along the front-rear direction in the frame portion 74. The front edge of the front door support portion 75F is integrally coupled to the front portion of the frame portion 74 by means of the front hinge portion 76F, which is curved below the front edge of the breakable portion 71. The rear edge of the rear door support portion 75R is integrally coupled to the rear portion of the frame portion 74 by means of the rear hinge portion 76R, which is curved below the rear edge of the breakable portion 71. The front door support portion 75F and the rear door support portion 75R are joined to the back side of the front door portion 72F and the back side of the rear door portion 72R, respectively, by means of joining means such as vibration welding, so as to reinforce the door portions 72F, 72R from the back side.

In this manner, the door support portions 75F, 75R are connected to the frame portion 74 through the hinge portions 76F, 76R provided at a side of the door support portions 75F, 75R, respectively. The three other sides of each of the door support portions 75F, 75R are slightly separated from the adjacent door support portions 75R, 75F and the frame portion 74. Therefore, the door support portions 75F, 75R open in opposite directions (front-rear direction), with the hinge portions 76F, 76R as fulcrums. That is, the door support portions 75F, 75R have a double-leaf-door structure.

On the back side of the frame portion 74, a tubular outer wall portion 53 extends downward from the edge of the frame portion 74. The structure of the tubular outer wall portion 53 is the same as that described in the first embodiment.

In the front passenger seat airbag apparatus 12 equipped with the airbag cover 50, when an impact is applied to the vehicle from the front due to a front collision, inflation gas inflates the airbag 15 while unfolding the airbag 15. The pressing force of the airbag 15 being inflated is applied to the front and rear door portions 72F, 72R via the front and rear door support portions 75F, 75R. The pressing force breaks the breakable portion 71, thereby separating the front and rear door portions 72F, 7R from the door adjacent portion 73. The front and rear door support portions 75F, 75R are pivoted upward together with the door portions 72F, 72R with the front and rear hinge portions 76F, 76R as fulcrums, respectively, as shown by two-dot chain lines in FIG. 9. Accordingly, the front and rear door portions 72F, 72R are opened forward and rearward, respectively.

Second Embodiment

A front passenger seat airbag apparatus according to a second embodiment of the present invention will now be described with reference to FIGS. 12 to 15.

The second embodiment is greatly different from the first embodiment in the following two points.
<Difference 1>
In the second embodiment, the four slits 56 formed in the four corners of the tubular outer wall portion 53 in the first embodiment are omitted in the second embodiment. The front outer wall 54 is connected to the adjacent side outer walls 64 at both sides, and the rear outer wall 55 is connected to the adjacent side outer wall 64 at both sides.

As described above, no slits 56 are formed in the four corners of the tubular outer wall portion 53. When a high pressure accompanying inflation and deployment of the airbag 15 is applied to the tubular outer wall portion 53, the tubular outer wall portion 53 (the front outer wall 54, the rear outer wall 55, and the side outer walls 64) is deformed in the same manner as the case of the first embodiment, in which slits 56 are provided. The deformation of the tubular outer wall 53 will be discussed below.

<Difference 2>

In place of the attachment bosses 13 of the first embodiment, an attachment boss 77 is attached to the outer surface of each side outer wall 64 of the tubular outer wall portion 53. In the second embodiment, the attachment boss 77 is made of the same material as the tubular outer wall portion 53 and is integrated with the outer surface of each side outer wall 64. The lower surface of each attachment boss 77 is located in the vicinity of the lower end of the side outer wall 64, more specifically, slightly above the lower end. The attachment bosses 77 may be formed by members independent from the tubular outer wall portion 53. Each attachment boss 77 may be fixed to the corresponding side outer wall 64 by means of fixing means such as adhesion, welding, and fastening.

Each attachment boss 77 and the corresponding side inner wall 33 of the case 25 are coupled to each other by a fitting bracket 78. Each fitting bracket 78 extends in a straight line from a lower portion of the corresponding side inner wall 33 to the outside along the widthwise direction of the vehicle, after passing through the corresponding attachment boss 77 of the tubular outer wall portion 53. Each fitting bracket 78 is formed of the same plate (steel plate) as the case 25, and formed integrally with the corresponding side inner wall 33. A pair of slits 79 are formed in each side inner wall 33 from the upper end toward the lower end to form the fitting bracket 78. A portion between the slits 79 is bent outward with the lower ends of the slits 79 as fulcrums, so as to form the fitting bracket 78. The fitting bracket attachment bosses 78 may be formed by members independent from the side inner walls 33. Each fitting bracket 78 may be fixed to the corresponding side inner wall 33 by means of fixing means such as welding and fastening.

Each fitting bracket 78 is fastened to the corresponding attachment boss 77 with a screw 69.

Except the above described differences 1, 2, the configuration of the second embodiment is substantially the same as that of the first embodiment. Therefore, like or the same reference numerals are given to those components that are like or the same as the corresponding components of the first embodiment and detailed explanations are omitted.

Figure 15A:
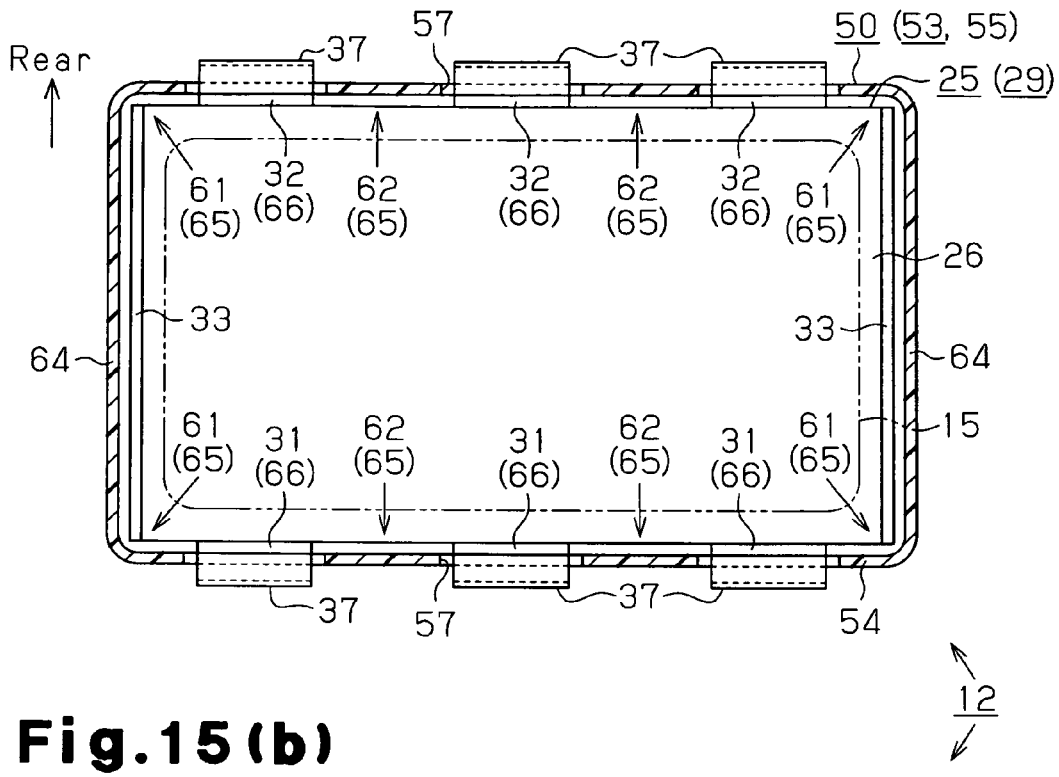
FIG. 15(A) is a diagram for explaining an operation of the front passenger seat airbag apparatus of FIG. 12, providing a schematic cross-sectional plan view only showing portions of the airbag cover engaged with the case when the airbag is not inflated or deployed.
Figure 15B:
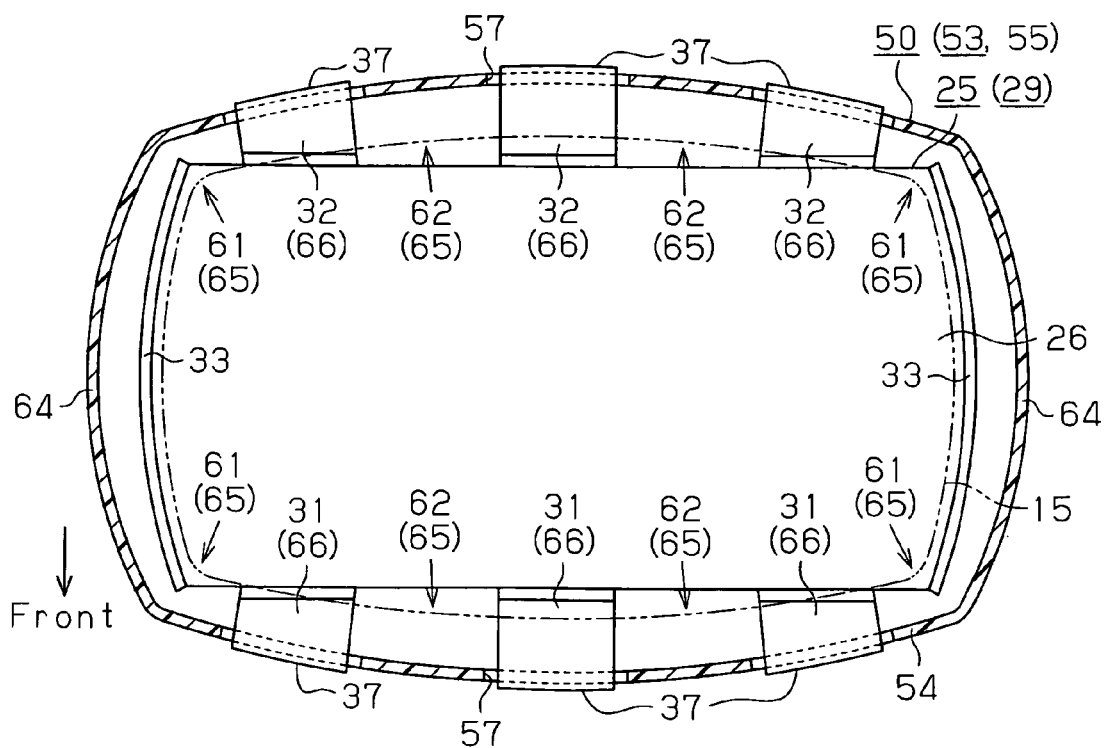
FIG. 15(B) is a schematic cross-sectional plan view only showing the portions of the airbag cover engaged with the case when the airbag is inflated and deployed.
Figure 16:
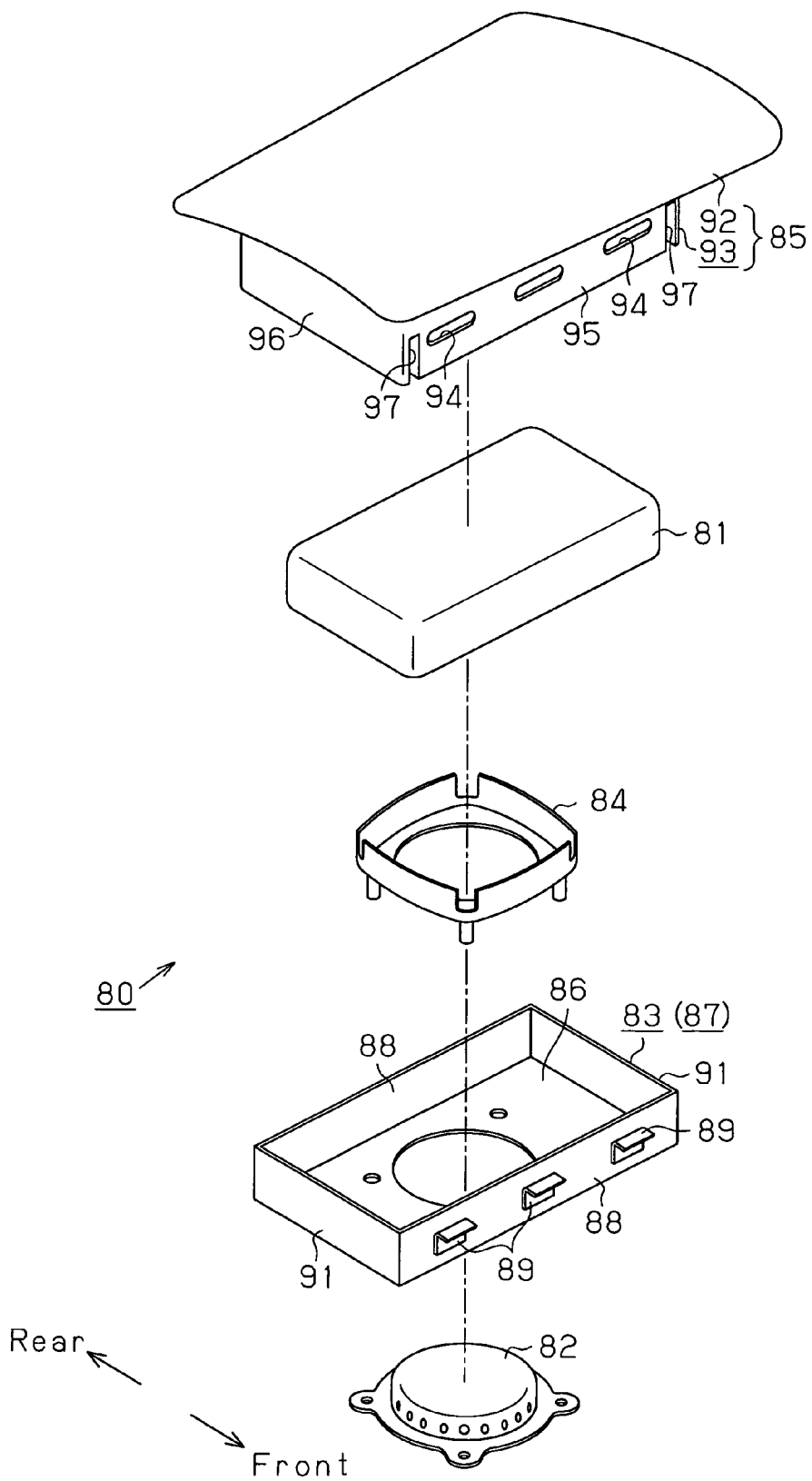
FIG. 16 is an exploded perspective view illustrating components of a prior art front passenger seat airbag apparatus in which a slit is formed in each of the four corners of a tubular outer wall portions.
Figure 17A:
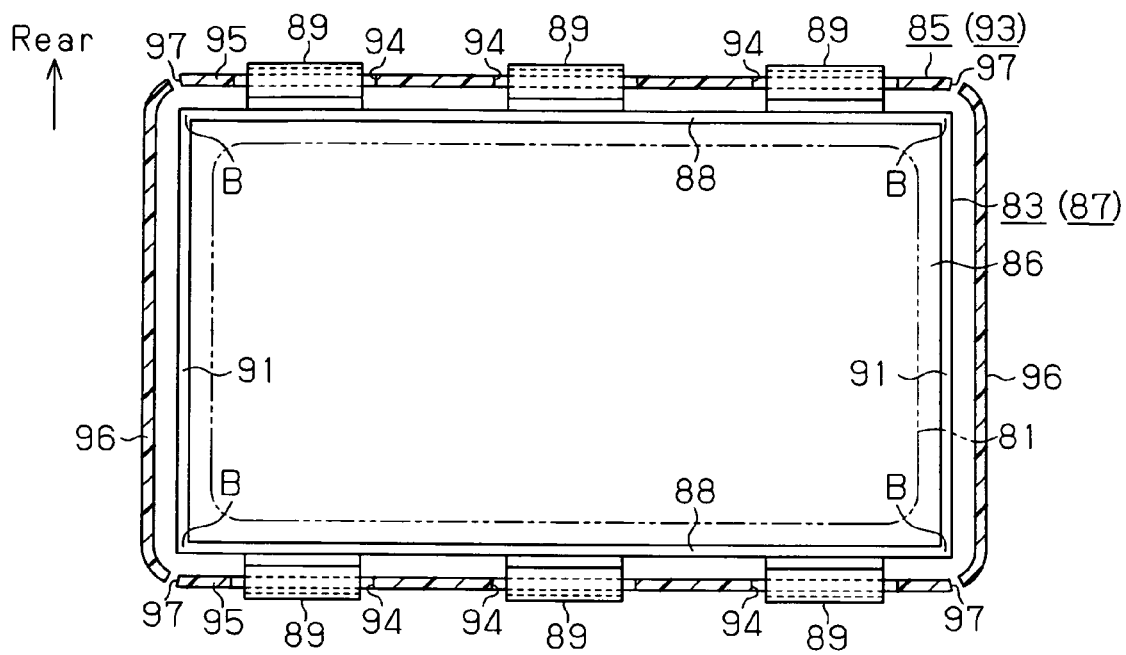
FIG. 17(A) is a diagram for explaining an operation of the front passenger seat airbag apparatus of FIG. 16, providing a schematic cross-sectional plan view only showing the structure of the portions of the airbag cover engaged with the case when the airbag is not inflated or deployed.
Figure 17B:
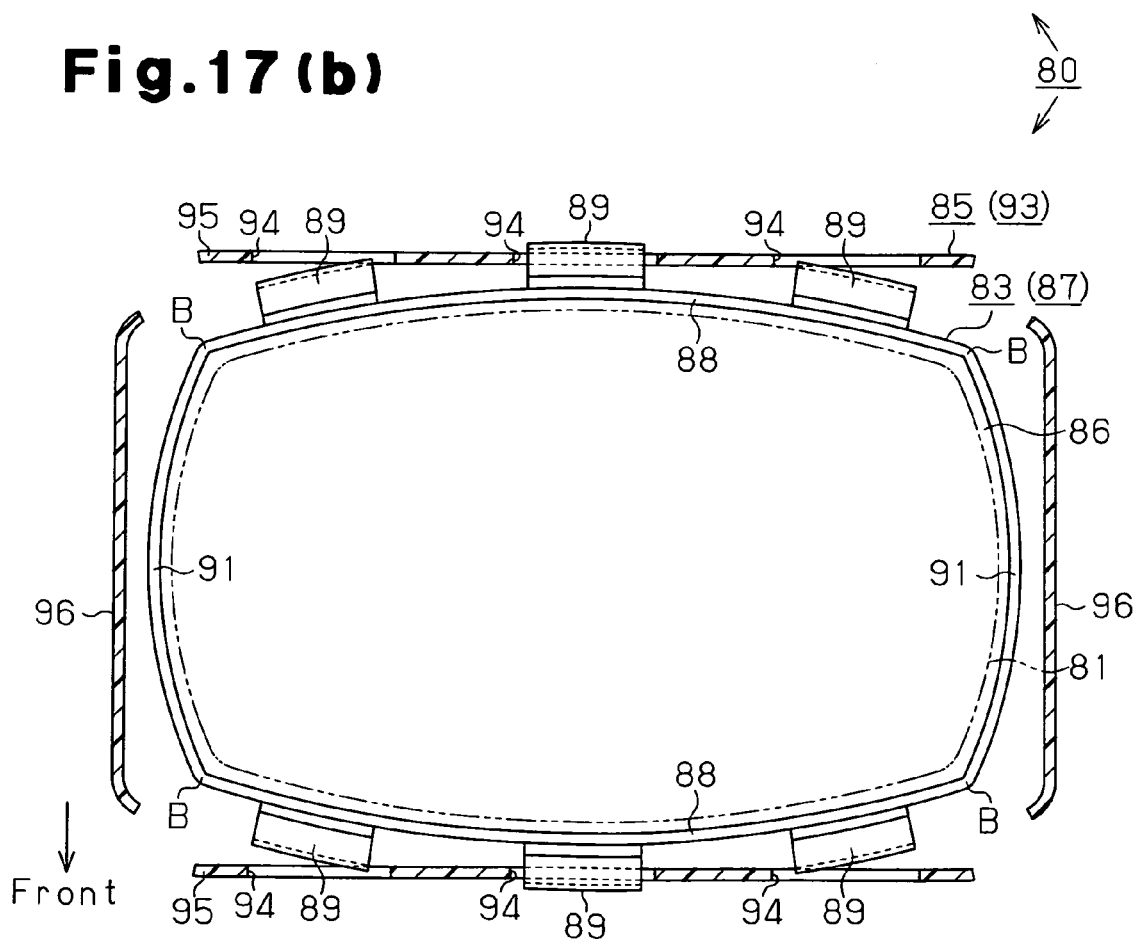
FIG. 17(B) is a schematic cross-sectional plan view only showing the structure of the portions of the airbag cover engaged with the case when the airbag is inflated and deployed.
Figure 18A:
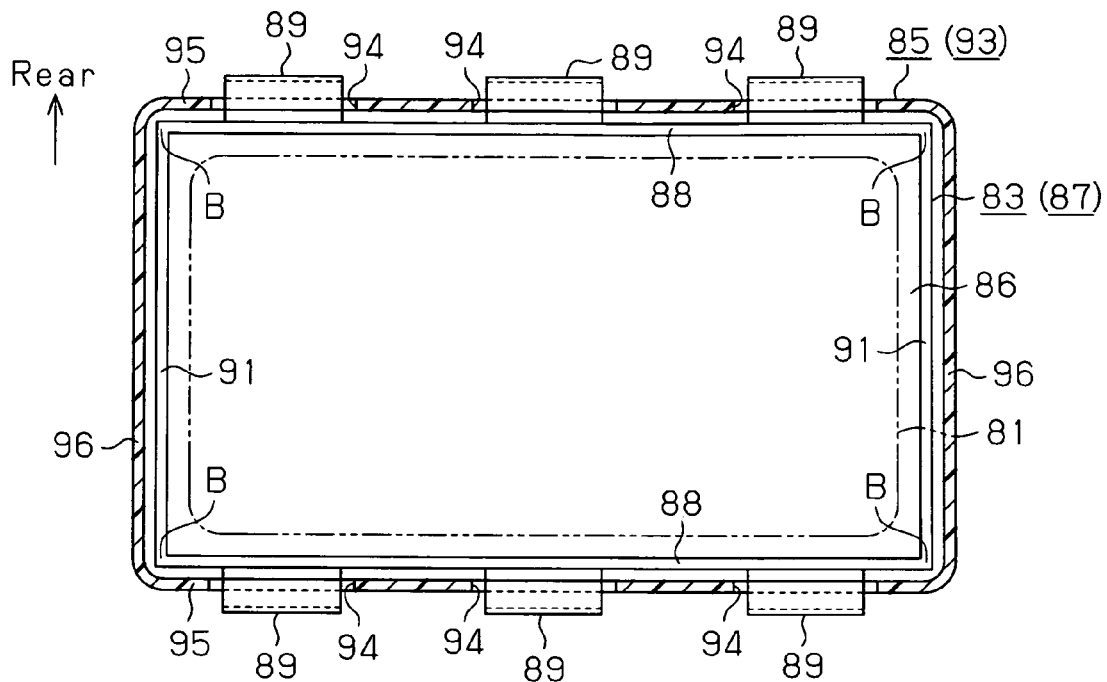
FIG. 18(A) is a diagram for explaining an operation of a prior art front passenger seat airbag apparatus in which not slit is formed in the four corners of the tubular outer wall portion, providing a schematic cross-sectional plan view only showing portions of the airbag cover engaged with the case when the airbag is not inflated or deployed.
Figure 18B:
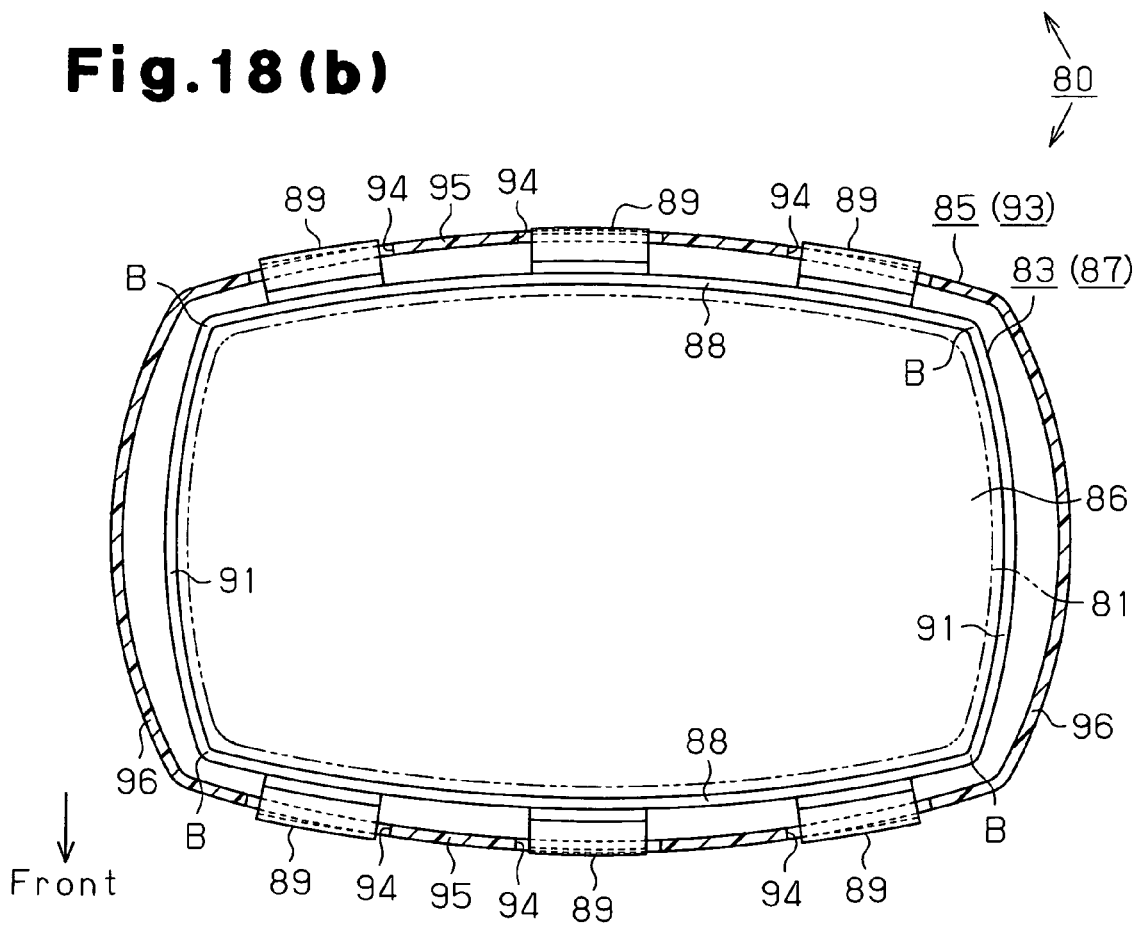
FIG. 18(B) is a schematic cross-sectional plan view only showing the portions of the airbag cover engaged with the case when the airbag is inflated and deployed.

Next, an operation of the front passenger seat airbag apparatus 12 according to the second embodiment will be described with reference to FIGS. 15(A) and 15(B). Specifically, a case where the airbag 15 is not inflated or deployed and the a case where the airbag 15 is inflated and deployed will be separately explained. FIGS. 15(A) and 15(B) only show portions of the airbag cover 50 that are engaged with the case 25, and the other parts are omitted. FIG. 15(A) shows the parts of the airbag cover 50 engaged with the case 25 when the airbag 15 is not inflated or deployed, and FIG. 15(B) shows the engaged parts when the airbag 15 is inflated and deployed.

<When the Airbag 15 is not Inflated or Deployed>

Since no high pressure accompanying inflation and deployment of the airbag 15 is applied to the tubular inner wall portion 29 or the tubular outer wall portion 53, the front passenger seat airbag apparatus 12 is in the same state as in the first embodiment. That is, as shown in FIG. 15(A), in the tubular inner wall portion 29, the front inner wall 31, the rear inner wall 32, and the side inner walls 33 are all maintained to be flat. The connected portions 66 and the non-connected portions 65 in the front inner wall 31 and the rear inner wall 32 are also maintained to be flat. Also, in the tubular outer wall portion 53, the front outer wall 54, the rear outer wall 55, and the side outer walls 64 are all maintained to be flat. In the tubular inner wall portion 29 and the tubular outer wall portion 53, the front inner wall 31, the rear inner wall 32, and the side inner walls 33 are arranged parallel with the front outer wall 54, the rear outer wall 55, and the side outer walls 64, respectively. Accordingly, the claw portions 37 of the connected portions 66 in the front inner wall 31 are arranged on a straight line along the widthwise direction of the vehicle, and so are the claw portions 37 of the connected portions 66 in the rear inner wall 32. In this state, the distances between the claw portions 37 of the connected portions 66 in the front inner wall 31 and the engaging holes 57, in which the claw portions 37 are inserted and engaged, in the front outer wall 54 are substantially uniform. Also, the distances between the claw portions 37 of the connected portions 66 in the rear inner wall 32 and the engaging holes 57, in which the claw portions 37 are inserted and engaged, in the rear outer wall 55 are substantially uniform. The manner in which the claw portions 37 are engaged with the engaging holes 57 do not vary widely depending on each claw portion 37.

<When the Airbag 15 is Inflated and Deployed>

In this case, a high pressure accompanying inflation and deployment of the airbag 15 is applied to the tubular inner wall portion 29, and the front inner wall 31 and the rear inner wall 32 receive forces that push the front inner wall 31 and the rear inner wall 32 outward of the tubular inner wall portion 29 so that they are deformed to have arched shapes.

On the other hand, the tubular outer wall portion 53 made of synthetic resin is more easily flexed than the tubular inner wall portion 29 made of metal. Therefore, the front outer wall 54 and the rear outer wall 55 of the tubular outer wall portion 53 are more easily flexed than the front inner wall and the rear inner wall 32 of the tubular inner wall portion 29. Further, the slits 56 in the four corners in the first embodiment are omitted from the tubular inner wall portion 29, and the front and rear outer walls 54, 55 are each connected to the adjacent side outer walls 64. The rigidity of the front outer wall 54 is significantly influenced by the side outer walls 64, and the rigidity of the rear outer wall 55 is also significantly influenced by the side outer walls 64.

Accordingly, the front outer wall 54 is deformed into an arched shape and bulges forward from the tubular outer wall portion 53, and the rear outer wall 55 is deformed into an arched shape and bulges rearward (refer to arrows of two-dot chain lines in FIG. 14). At this time, the amount of deformation of the front outer wall 54 and the rear outer wall 55 is greater than the amount of deformation of the front inner wall 31 and the rear inner wall 32 when they are deformed into arched shapes. Thus, the space between each claw portion 37 and the corresponding engaging hole 57 is small at both ends with respect to the arrangement direction of the claw portions 37, and is great at a center.

In the second embodiment, the cutout portions 62 are provided in the non-connected portions 65 in the vicinity of the center portion with respect to the arrangement direction of the claw portions 37. Each cutout portion 62 extends from the upper end of the corresponding one of the front and rear inner walls 31, 32 to a position lower than the tip 37A of the corresponding claw portion 37. The connected portions 66 that are adjacent to each other in the vicinity of the center portion of each of the front inner wall 31 and the rear inner wall 32 are disconnected from each other. The rigidity of one of these connected portion 66 is not significantly influenced by the other connected portion 66. These connected portions 66 are more easily deformed than the case of the prior art airbag apparatus having no cutout portions 62.

Therefore, the connected portions 66 are deformed following the tubular outer wall portion 53, which is deformed into an arched shape and bulges outward of the tubular inner wall portion 29 (refer to arrows of solid lines in FIG. 14). At the intermediate position with respect to the arrangement direction of the claw portions 37, the distance between each of the claw portions 37 and the corresponding engaging holes 57 is decreased. In each of both ends in the arrangement direction, the distance between the claw portion 37 and the corresponding engaging hole 57 is originally small. The distance between the claw portions 37 at the intermediate position with respect to the arrangement direction and the corresponding engaging holes 57 approaches the small distance between the claw portion 37 at either end and the corresponding engaging hole 57. Compared to the case of the prior art airbag apparatus, in which no cutout portions 62 are formed, the variation of the distance between the claw portions 37 and the corresponding engaging holes 57 is reduced.

As a result, when the airbag 15 is inflated and deployed, the manner in which the claw portions 37 are engaged with the engaging holes 57 do not vary widely as in the case where the airbag 15 is not inflated or deployed. Compared to the case of the prior art airbag apparatus, in which no cutout portions 62 are formed, the balance of engaging force applied to the case 25 of the airbag cover 50 is maintained. As a result, the inflation and deployment performance of the airbag 15 is improved.

The lower the positions of the lower ends of the cutout portions 62, the smaller the influence of each connected portion 66 in the center portion with respect to the arrangement direction of the claw portions 37 on an adjacent connected portion 66 becomes. This is because each adjacent pair of the connected portions 66 are disconnected from each other by a cutout portion 62 to a low position. Therefore, when receiving a high pressure from the airbag 15 being inflated and deployed, the connected portions 66 in the center portion are readily deformed.

In this respect, in the second embodiment, each cutout portion 62 reaches a position slightly above the bottom portion 26 in the corresponding non-connected portion 65 of each of the front and rear inner walls 31, 32, or a position near the lowest possible position of the cutout portion 62 (position reaching the bottom portion 26). Therefore, each connected portion 66 is more readily deformed, following the deformation of the front outer wall 54 and the rear outer wall 55 of the tubular outer wall portion 53. As a result, since the connected portions 66 are easily deformed, the variation of the distance between the claw portions 37 and the corresponding engaging holes 57 is reduced. Accordingly, the manner in which the claw portions 37 are engaged with the engaging holes 57 varies less widely.

In addition to the cutout portions 62, the front and rear inner walls 31, 32 each have the cutout portions 61 at the non-connected portions 65 at both ends. Each cutout portion 61 extends from the upper end of the corresponding one of the front and rear inner walls 31, 32 to a position lower than the tip 37A of the corresponding claw portion 37. The connected portions 66 at both ends are each disconnected and independent from the adjacent side inner wall 33 by the corresponding cutout portion 61. The influence of each side inner wall 33 on the rigidity of the corresponding connected portions 66 at both ends via the non-connected portions 65 is less than that in the case where no cutout portions 61 are provided in the non-connected portions 65. This reduces the variation of the distance between the claw portions 37 of the connected portions 66 and the corresponding engaging holes 57 when the airbag 15 is inflated and deployed. Accordingly, the variation in the manner in which the claw portions 37 are engaged with the engaging holes 57 is smaller than that of the case of the prior art airbag apparatus. Therefore, the balance of engaging force applied to the case 25 of the airbag cover 50 is maintained in a favorable manner between the claw portions 37.

In each of the front inner wall 31 and the rear inner wall 32 of the tubular inner wall portion 29, the lower the positions of the lower ends of the cutout portions 61, the smaller the influence of the adjacent side inner walls 33 on the rigidity of the connected portions 66 at both ends in the arrangement direction of the claw portions 37 becomes. This is because each connected portion 66 and the adjacent side inner wall 33 is disconnected by the corresponding cutout portion 61 to a relatively low position. Therefore, when receiving a high pressure from the airbag 15 being inflated and deployed, the connected portions 66 at both ends in the arrangement direction are easily deformed.

In this respect, in the second embodiment, each cutout portion 61 reaches the bottom portion 26 of the case 25 in the corresponding non-connected portion 65 of the front and rear inner walls 31, 32, or the lowest possible position of the cutout portion 61. Therefore, in each of the front inner wall 31 and the rear inner wall 32, the connected portions 66 at both ends in the arrangement direction are easily deformed. A plurality of (three) connected portions 66 in each of the front and rear inner walls 31, 32 more readily follow deformation of the tubular outer wall portion 53. The variation of the distance between the claw portions 37 and the corresponding engaging holes 57 is reduced. As a result, the manner in which the claw portions 37 are engaged with the engaging holes 57 varies less widely.

Thus, the second embodiment has the following advantage in addition to the advantages (1) to (5) of the first embodiment.

(6) The tubular outer wall portion 53 is formed to be tubular by a plurality of outer walls (the front outer wall 54, the rear outer wall 55, and the side outer walls 64), which are more easily flexed by the inner walls of the tubular inner wall portion 29 (the front inner wall 31, the rear inner wall 32, and the side inner walls 33). The slits 56 in the four corners of the tubular outer wall portion 53 of the first embodiment are all omitted. The front outer wall 54 and the rear outer wall 55 each having engaging holes 57 are connected to the adjacent side outer walls 64. In each of the front and rear inner walls 31, 32, the non-connected portions 65 in the vicinity of the center portion in the arrangement direction of the claw portions 37 have cutout portions 62. Each cutout portion 62 extends from the upper end of the corresponding one of the front and rear inner walls 31, 32 to a position lower than the tip 37A of the corresponding claw portion 37. Therefore, each connected portion 66 is disconnected from the adjacent connected portion 66.

Thus, a high pressure accompanying inflation and deployment of the airbag 15 causes the front outer wall 54 and the rear outer wall 55 of the tubular outer wall portion 53 to be deformed into arched shapes by a greater amount than the front inner wall 31 and the rear inner wall 32 of the tubular inner wall portion 29. Even in this case, the connected portions 66 in the vicinity of the center portion with respect to the arrangement direction can be deformed following each of the front outer wall 54 and the rear outer wall 55.

The distance between the claw portions 37 at the intermediate position with respect to the arrangement direction and the corresponding engaging holes 57 approaches the distance between the claw portions 37 at both ends with respect to the arrangement direction and the corresponding engaging holes 57. Therefore, compared to a case where no cutout portions 62 are formed in the non-connected portions 65 in the vicinity of the center portion with respect to the arrangement direction, the variation among the claw portions 37 of the distance between the claw portions 37 and the corresponding engaging holes 57 is reduced.

As a result, the balance of engaging force applied to the case 25 of the airbag cover 50 is maintained as in the case where the airbag 15 is not inflated or deployed, and the inflation and deployment performance of the airbag 15 is improved.

Also, no measures need to be taken for increasing the rigidity of the front and rear inner walls 31, 32 in the tubular inner wall portion 29 so that they are less easily deformed. Therefore, the weight of the front passenger seat airbag apparatus 12 is prevented from being increased due to such measures. Further, forming the cutout portions 62 reduces the weight of the case 25, so that the weight of the entire airbag apparatus 12 is reduced.

The advantages of forming the cutout portions 62 are achieved when the lower end of each cutout portion 62 is at least lower than the tips 37A of the claw portions 37.

(7) Since each cutout portion 62 extends to the vicinity of the upper end of the bottom portion 26 of the case 25 in the non-connected portions 65, each connected portion 66 is clearly separated from the adjacent connected portion 66.

Therefore, the balance of engaging force applied to the case 25 of the airbag cover 50 is maintained in a further favorable manner. Also, since each cutout portion 62 is elongated, the weight of the case 25 is further reduced.

(8) In each of the front and rear inner walls 31, 32 having claw portions 37, cutout portions 61 are provided in the non-connected portions 65 at both ends in the arrangement direction of the claw portions 37, not in the vicinity of the center portion with respect to the arrangement direction. Accordingly, the connected portions 66 at both ends in the arrangement direction are disconnected from the adjacent side inner walls 33.

Therefore, the balance of engaging force applied to the case 25 of the airbag cover 50 is maintained in a favorable manner. Further, since a cutout portion 62 is formed in the non-connected portion 65 in each end in the arrangement direction, the weigh of the case 25 is further reduced.

The advantages of forming the cutout portions 61 are achieved when the lower end of each cutout portion 61 is at least lower than the tips 37A of the claw portions 37.

(9) Each cutout portion 61 reaches the bottom portion 26 in the corresponding non-connected portion 65. Accordingly, the connected portions 66 at both ends in the arrangement direction are more clearly disconnected from the adjacent side inner walls 33. Therefore, the balance of engaging force applied to the case 25 of the airbag cover 50 is maintained in a favorable manner. Also, since each cutout portion 61 is elongated, the weight of the case 25 is further reduced.

(10) In a case where the attachment bosses 13 and the instrument panel 11 of the first embodiment are molded integrally, the attachment bosses 13 shrink after molding. This might cause sink marks on the surface of the instrument panel. In the present embodiment, however, the attachment bosses 77 are formed on the airbag cover 50, instead of the attachment bosses 13. Accordingly, sink marks, which might form on the surface of the instrument panel 11 by forming the attachment bosses 13, are prevented from being formed. Even if sink marks appear on the surface when the airbag cover 50 is molded of resin, the airbag cover 50 cannot be seen by occupants. The appearance of the instrument panel 11 is therefore not degraded.

(11) A pair of slits 79 are formed in each side inner wall 33 of the tubular inner wall portion 29 to form the fitting bracket 78. Each portion between the slits 79 is bent outward of the case 25 with the lower end as a fulcrum. This reduces the size of the steel plate used for forming the case 25, which includes the fitting brackets 78.

The present invention may be embodied in the following forms.

<Regarding Claw Portions 37>

In the first and second embodiments, the number of the claw portions 37 in each of the front inner wall 31 and the rear inner wall 32 may be changed, as long as the number is two or more. In this case, the number of the claw portions 37 in the front inner wall 31 and the number of the claw portions 37 in the rear inner wall 32 may be different. The minimum number of the claw portions 37 in each of the front inner wall 31 and the rear inner wall 32 is two.

In the first and second embodiments, the number of the claw portions 37 in each of the front inner wall 31 and the rear inner wall 32, as long as the number is two or more. In this case, the number of the claw portions 37 in the front inner wall 31 and the number of the claw portions 37 in the rear inner wall 32 may be different. The minimum number of the claw portions 37 in each of the front inner wall 31 and the rear inner wall 32 is two.

The position of each claw portion 37 in the up-down direction may be different from that in the first and second embodiments, but may be changed to a position lower than the upper end of the corresponding one of the front inner wall 31 and the rear inner wall 32. In this case, the heights of the claw portions 37 in the front inner wall 31 may be uneven. The same change may be made to the claw portions 37 in the rear inner wall 32. In the front inner wall 31 and the rear inner wall 32, the heights of each facing pair of the claw portions 37 may be different.

In each of the first and second embodiments, the claw portions 37 may be formed by members separate from the non-connected portions 65 and joined to the non-connected portions 65. In this case, welding, adhesion, riveting may be employed as joining means.

The outer shape of the claw portions 37 may be different from those shown in each of the first and second embodiments, as long as each claw portion 37 extends at least outward from the tubular inner wall portion 29. For example, each claw portion 37 may be a flat plate that extends in a straight line outward from the tubular inner wall portion 29. In this case, each claw portion 37 may extend perpendicular to the tubular inner wall portion 29, or may be inclined downward.

In each of the first and second embodiment, a pair of slits extending downward from the upper end may be formed in at least one of the front inner wall 31 and the rear inner wall 32, and a claw portion 37 may be formed by bending a portion between the slits.

<Regarding Cutout Portions 61, 62>

The lower ends of the cutout portions 61, 62 may be changed to positions different from those in the first and second embodiments, within a range from the tips 37A of the claw portions 37 to the bottom portion 26.

In the first embodiment, a cutout portion 61 must be formed in at least each of the non-connected portions 65 at both ends among all the non-connected portions 65. However, the cutout portions in portions except the non-connected portions 65 at both ends, that is, the cutout portions in the intermediate portion may be omitted. The non-connected portions 65 from which cutout portions may be omitted include the non-connected portions 65 located in the vicinity of the center portion with respect to the arrangement direction. If this change is made, the variation of the manner in which the claw portions 37 are engaged with the engaging holes 57 is reduced, although not as much as in the case where the cutout portions 62 are not omitted.

In the first embodiment, in addition to forming the cutout portions 61 in the non-connected portions 65 at both ends in the arrangement direction of the claw portions 37, the number of the cutout portions 62 provided in the non-connected portions 65 at positions other than both ends may be changed. In this case, a cutout portion 62 is formed in at least one of the non-connected portions 65 located in the intermediate portion with respect to the arrangement direction.

In the second embodiment, a cutout portion 62 must be formed in at least each of the non-connected portions 65 in the vicinity of the center portion with respect to the arrangement direction of the claw portions 37 among all the non-connected portions 65. However, the cutout portions in portions except the non-connected portions 65 at the center portion may be omitted. The non-connected portions 65 from which cutout portions may be omitted include the non-connected portions 65 located at both ends in the arrangement direction. If this change is made, the variation of the manner in which the claw portions 37 are engaged with the engaging holes 57 is reduced, although not as much as in the case where the cutout portions 62 are not omitted.

In the second embodiment, in addition to forming the cutout portions 61 in the non-connected portions 65 at the center portion in the arrangement direction of the claw portions 37, the number of the cutout portions provided in the non-connected portions 65 at positions other than the center portion may be changed. In this case, a cutout portion 62 is formed in at least one of the non-connected portions 65 except the ones located in the vicinity of the center portion with respect to the arrangement direction.

The number of the cutout portions 62 may be different between the front inner wall 31 and the rear inner wall 32.

The cutout portions 61, 62 may be formed along the entire width of each non-connected portion 65 or may be formed only in a part of each non-connected portion 65.

<Regarding Whole Case 25>

The positions and number of the reinforcing portions 35 in the case 25 may be changed as necessary. For example, the reinforcing portions 35 formed in one of the side inner wall 33 do not need to be located at positions facing the reinforcing portions 35 provided in the other side inner wall 33. Further, the reinforcing portions 35 may be omitted.

The shape of the tubular inner wall portion 29 of the case 25 may be changed as long as it is formed in a tubular shape with three or more wall portions extending upward from the bottom portion 26. Therefore, the tubular inner wall portion 29 may be triangular tube. In this case, the bottom portion 26 of the tubular inner wall portion 29 is triangular, and three wall portions extend from the edges of the triangle. Also, the tubular inner wall portion 29 may be a quadrilateral tube having a square or trapezoid bottom portion 26. In this case, four wall portions extending upward from the edges of the bottom portion 26 are provided. Further, the tubular inner wall portion 29 may be a polygonal tube having a bottom portion 26 having five or more sides. In this case, a plurality of wall portions extending upward from the edges of the bottom portion 26 are provided. In any of these cases, a plurality of claw portions 37 extend outward from each of at least two inner walls and are arranged substantially horizontally along the wall surface of the corresponding inner wall.

Therefore, the present examples and embodiments are to be considered as illustrative and not restrictive and the invention is not to be limited to the details given herein, but may be modified within the scope and equivalence of the appended claims.

What is claimed is:

1. A front passenger seat airbag apparatus installed inside an instrument panel located in front of a front passenger seat, comprising:
    an airbag;
    a case for supporting the airbag, wherein the case includes a bottom portion located below the airbag and a tubular inner wall portion that surrounds the airbag with three or more inner walls extending upward from the bottom portion, wherein each of at least two inner walls of the tubular inner wall portion has a plurality of claw portions, which extend at least outward of the inner wall and each have a tip, the claw portions being arranged on the wall surface of the inner wall along a horizontal direction; and
    an airbag cover that covers the airbag and the case,
    wherein the airbag cover includes a lid portion and a tubular outer wall portion, the lid portion forming a part of the instrument panel and covering the tubular inner wall portion, and the tubular outer wall portion extending downward from the lid portion and surrounding the tubular inner wall portion,
    wherein a plurality of engaging holes are formed in the tubular outer wall portion, each claw portion being inserted in and engaged with one of the engaging holes, so that the airbag cover is engaged with the case,
    wherein each of the inner walls on which the claw portions are provided includes a plurality of connected portions to each of which at least one claw portion is connected, and a plurality of non-connected portions to each of which no claw portion is connected, and wherein at least one of the non-connected portions has a cutout portion that extends from the upper end of the corresponding inner wall to a position lower than the tip of the corresponding claw portion,
    wherein, in each of the inner walls on which claw portions are provided, the cutout portions are provided in non-connected portions at both ends with respect to a direction along which the claw portions are arranged, and
    wherein the cutout portions extend to the bottom portion of the case or to the vicinity of the bottom portion.

2. The front passenger seat airbag apparatus according to claim 1, wherein the tubular outer wall portion is formed by a plurality of outer walls, at least two of which each have two or more of the engaging holes, wherein each of the outer walls that have engaging holes is disconnected from the adjacent outer walls on both sides.

3. The front passenger seat airbag apparatus according to claim 2, wherein, in each of the inner walls on which claw portions are provided, the cutout portions are provided in each non-connected portion between adjacent connected portions.

4. The front passenger seat airbag apparatus according to claim 1, wherein the tubular outer wall portion includes a plurality of outer walls having a higher flexibility than the inner walls of the tubular inner wall portion, each of the outer walls in which engaging holes are formed is connected to the adjacent outer walls, and wherein, in each of the inner walls on which claw portions are provided, the cutout portions are provided in non-connected portions at a center portion with respect to a direction along which the claw portions are arranged.

5. The front passenger seat airbag apparatus according to claim 4, wherein, in each of the inner walls on which claw portions are provided, the cutout portions are provided in at least one non-connected portion located at a position different from the center portion with respect to the arrangement direction of the claw portions.

6. The front passenger seat airbag apparatus according to claim 1, wherein the cutout portions extend to the bottom portion of the case.

7. The front passenger seat airbag apparatus according to claim 1, wherein the claw portions and the connected portions are formed integrally by processing a single plate.

8. The front passenger seat airbag apparatus according to claim 1, wherein said three or more of the inner walls of the tubular inner wall portion include a front inner wall and a rear inner wall, which face each other, three of the claw portions and three of the connected portions are provided in each of the front inner wall and the rear inner wall, wherein the cutout portions are each provided in each of the non-connected portions located on both sides of each connected portion.

9. The front passenger seat airbag apparatus according to claim 1, wherein a plurality of reinforcing portions extend linearly along a front-rear direction on a boundary between the bottom portion of the case and the inner wall.

10. The front passenger seat airbag apparatus according to claim 1, wherein the cutout portions provided at both ends of the inner walls extend closer to the bottom portion of the case than the cutout portion between the claw portions on a same inner wall.

11. The front passenger seat airbag apparatus according to claim 1, wherein the cutout portions provided at both ends of the inner walls extend to the bottom portion of the case and the cutout portion between the claw portions on a same inner wall extend to the vicinity of the bottom portion.

12. A front passenger seat airbag apparatus installed inside an instrument panel located in front of a front passenger seat, comprising:

an airbag;

a case for supporting the airbag, wherein the case includes a bottom portion located below the airbag and a tubular inner wall portion that surrounds the airbag with three or more inner walls extending upward from the bottom portion, wherein each of at least two inner walls of the tubular inner wall portion has a plurality of claw portions, which extend at least outward of the inner wall and each have a tip, the claw portions being arranged on the wall surface of the inner wall along a horizontal direction; and an airbag cover that covers the airbag and the case, wherein the airbag cover includes a lid portion and a tubular outer wall portion, the lid portion forming a part of the instrument panel and covering the tubular inner wall portion, and the tubular outer wall portion extending downward from the lid portion and surrounding the tubular inner wall portion, wherein a plurality of engaging holes are formed in the tubular outer wall portion, each claw portion being inserted in and engaged with one of the engaging holes, so that the airbag cover is engaged with the case, wherein each of the inner walls on which the claw portions are provided includes a plurality of connected portions to each of which at least one claw portion is connected, and a plurality of non-connected portions to each of which no claw portion is connected, and wherein at least one of the non-connected portions has a cutout portion that extends from the upper end of the corresponding inner wall to a position lower than the tip of the corresponding claw portion, wherein, in each of the inner walls on which claw portions are provided, the cutout portions are provided in non-connected portions at both ends with respect to a direction along which the claw portions are arranged, and wherein the cutout portion between the claw portions on a same inner wall extend to the bottom portion of the case or to the vicinity of the bottom portion, and the cutout portions provided at both ends of the inner walls extend to the bottom portion of the case.

\* \* \* \* \*